US011868476B2

(12) United States Patent
Vetter et al.

(10) Patent No.: US 11,868,476 B2
(45) Date of Patent: Jan. 9, 2024

(54) BOOT-SPECIFIC KEY ACCESS IN A VIRTUAL DEVICE PLATFORM

(71) Applicant: Hypori, LLC, Reston, VA (US)

(72) Inventors: Brian J. Vetter, Austin, TX (US); Phani Achanta, Austin, TX (US); Mohammad Salman Dhedhi, Round Rock, TX (US); Muhammad Irfan Azam, Reston, VA (US); Terrimane Shon Pritchett, Reston, VA (US)

(73) Assignee: HYPORI, INC., Reston, VA (US)

( * ) Notice: Subject to any disclaimer, the term of this patent is extended or adjusted under 35 U.S.C. 154(b) by 0 days.

(21) Appl. No.: 17/344,358

(22) Filed: Jun. 10, 2021

(65) Prior Publication Data

US 2022/0100862 A1 Mar. 31, 2022

Related U.S. Application Data

(60) Provisional application No. 63/033,777, filed on Jun. 2, 2020.

(51) Int. Cl.
| | | |
|---|---|---|
| G06F 21/57 | (2013.01) | |
| G06F 21/60 | (2013.01) | |
| G06F 21/33 | (2013.01) | |
| G06F 21/72 | (2013.01) | |
| G06F 21/10 | (2013.01) | |

(52) U.S. Cl.
CPC ........... *G06F 21/575* (2013.01); *G06F 21/33* (2013.01); *G06F 21/602* (2013.01); *G06F 21/604* (2013.01); *G06F 21/72* (2013.01); *G06F 21/107* (2023.08); *G06F 21/1014* (2023.08)

(58) Field of Classification Search
CPC ...... G06F 21/575; G06F 21/33; G06F 21/602; G06F 21/604; G06F 21/72; G06F 2221/0711; G06F 2221/0751
See application file for complete search history.

(56) References Cited

U.S. PATENT DOCUMENTS

| | | | |
|---|---|---|---|
| 6,871,278 B1 * | 3/2005 | Sciupac | H04L 63/0442 705/64 |
| 9,147,086 B1 * | 9/2015 | Potlapally | G06F 21/64 |
| 2013/0191643 A1 * | 7/2013 | Song | H04L 9/3265 713/176 |
| 2014/0164793 A1 * | 6/2014 | Hadley | G06F 21/78 713/193 |
| 2016/0246637 A1 * | 8/2016 | Divakarla | G06F 16/955 |
| 2017/0097828 A1 * | 4/2017 | Kim | G06F 16/2365 |
| 2018/0268146 A1 * | 9/2018 | Suryanarayana | G06F 21/445 |
| 2018/0365045 A1 * | 12/2018 | Hakala | H04L 9/3247 |
| 2020/0044868 A1 * | 2/2020 | Vakulenko | G06F 21/305 |

* cited by examiner

*Primary Examiner* — Theodore C Parsons
*Assistant Examiner* — Alan L Kong
(74) *Attorney, Agent, or Firm* — Pillsbury Winthro Shaw Pittman, LLP

(57) ABSTRACT

Some embodiments may facilitate boot-specific key access to perform cryptographic operations. A first boot record and a second boot record may be generated independently in response to a request to boot a virtual device. The first and second boot records may be compared and in response to a match between the first boot record and the second boot record, an identify certificate may be obtained. Authorization to access and use a key for cryptographic operations may be obtained in response to a verification of the identity certificate by a cryptographic processor.

16 Claims, 6 Drawing Sheets

BOOT-SPECIFIC KEY ACCESS IN A VIRTUAL DEVICE PLATFORM

CROSS REFERENCE TO RELATED APPLICATIONS

This application claims benefit of U.S. Provisional Patent Application No. 63/033,777, filed Jun. 2, 2020. The contents of which is hereby incorporated by reference in its entirety.

FIELD OF THE INVENTION

The invention relates to facilitating boot-specific key access to allow a trusted virtual device to access and use keys for performing cryptographic operations in a virtual device platform.

BACKGROUND OF THE INVENTION

Keys associated with a virtual device may be utilized to perform cryptographic operations. However, in a virtual device platform, these keys may be stored in data partitions that may be accessible to bad actors and thus, the keys may not be protected from being improperly used. Specifically, virtual device platforms may allow bad actors (for example, who have access to a cryptographic processor and data stored in the data partitions) to boot their own version of a virtual device (e.g., an older version of an operating system, a vulnerable version of an operating system, or a version of an operating system including tools to control or spy on applications), to access the keys stored in the data partitions, and to communicate with or access the cryptographic processor, thereby allowing such a version of the virtual device to be able to access and use the keys for cryptographic operations via the cryptographic processor. Accordingly, a bad actor may use the keys to access sensitive data or to impersonate an actual owner of a virtual device and keys. These and other drawbacks exist.

SUMMARY OF THE INVENTION

Aspects of the invention relate to methods, apparatuses, and/or systems for facilitating boot-specific key access to perform cryptographic operations in a virtual device platform.

In some embodiments, a virtual device platform may generate first and second boot records (e.g., in response to a request to boot a virtual device). The first boot record may include a boot identifier (e.g., associated with the request to boot a virtual device) and a first boot process identifier (e.g., associated with a process of booting the virtual device). The second boot record (e.g., which is independently generated) may include the boot identifier (e.g., associated with the request to boot a virtual device) and a second boot process identifier (e.g., associated with a process of booting the virtual device). The virtual device platform may compare the boot records (e.g., to determine whether the virtual device that is being booted is a trusted virtual device) and in response to a match between the boot records, an identity certificate may be obtained. A cryptographic processor may obtain the identity certificate and authorize the use of a key (e.g., authorize the virtual device to use and access the key to perform cryptographic operations) after verifying the identity certificate.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
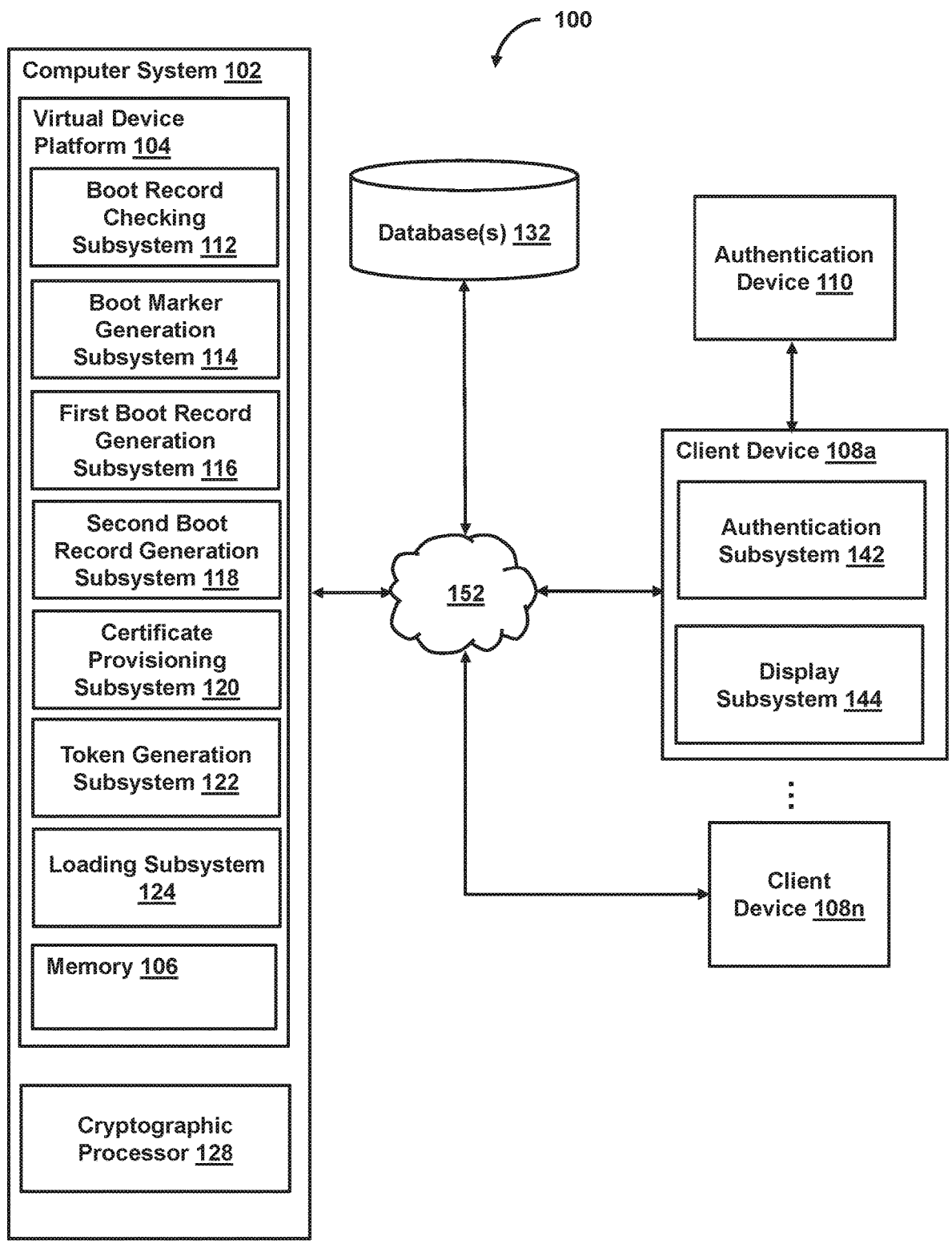
FIG. 1 shows a system for facilitating boot-specific key access to perform cryptographic operations in a virtual device platform, in accordance with one or more embodiments.

FIG. 1 shows a system 100 for facilitating boot-specific key access to allow a trusted virtual device to access keys for performing cryptographic operations in a virtual device platform, in accordance with one or more embodiments. In some embodiments, a virtual device platform may separately and independently generate a first boot record (e.g., generated by a first component of the virtual device platform) and a second boot record (e.g., generated by a second component of the virtual device platform) associated with a virtual device that is being booted (or loaded) and compare the boot records. When the boot records match, the virtual device platform may determine that the virtual device that is being loaded is a trusted virtual device. This comparison between boot records is important and is advantageous in order to prevent a bad actor from being able to load an older or different version of a virtual device (e.g., an older version of an operating system, an older patch level associated with a version of an operating system, or a vulnerable version of an operating system). Further, an identity certificate pair may be obtained in response to a match between the boot records and a cryptographic processor authorizes the trusted virtual device to access and use a key in response to a positive verification of the identity certificate. Accordingly, the system 100 facilitates boot-specific key access such that a trusted virtual device (that is being booted) is allowed to access and use keys for performing cryptographic operations in a virtual device platform.

As shown in FIG. 1, system 100 may include computer system 102 (e.g., one or more servers), client device 108 (or client devices 108a-108n), authentication device 110 (e.g., YubiKey™, RSA SecurID™, Titan Security Key™, etc.), database 132, or other components. Computer system 102 may include a virtual device platform 104 (or a plurality of virtual device platforms 104) including boot record checking subsystem 112, boot marker generation subsystem 114, first boot record generation subsystem 116, second boot record generation subsystem 118, certificate provisioning subsystem 120, token generation subsystem 122, loading subsystem 124, memory 106, or other components. Further, the computer system 102 may include a cryptographic processor 128 or a cyrptoprocessor 128 (e.g., Hardware Security Module (HSM)), or other components. Although the cryptographic processor 128 is illustrated as being external to the virtual device platform 104, it should be understood that the virtual device platform 104 may include the cryptographic processor 128. In some embodiments, the cryptographic processor 128 may be external to the computer system 102 and may be connected to the computer system 102 via network 152 or another network (e.g., a network that the client device 108 or the authentication device 110 are unable to access). The cryptographic processor 128 may be connected to the virtual device platform 104 via a network proxy.

Client device 108 (also referred to as a physical device, a physical client device, or user device) may include authentication subsystem 142, display subsystem 144, or other components. Each client device 108 may include any type of mobile terminal, fixed terminal, or other device. By way of example, client device 108 may include a desktop computer, a notebook computer, a tablet computer, a smartphone, a wearable device, or other physical client device. In some embodiments, a virtual device platform 104 may boot, load, host, or execute one or more virtual devices. A virtual device may be a remote execution environment for the services and applications that make up a device. Each virtual device may thus be a remote execution environment for the services and applications that make up a client device 108 and thus a virtual device may function similarly to a physical client device 108 except that the operating system, data, and applications reside and run on a computer system 102 (e.g., a server or a virtual device platform 104). Virtual devices may thus include virtual applications, such as browsers, emails, games, productivity applications or other applications that execute in the computer system 102. In one embodiment, computer system 102 (e.g., virtual device platform 104) may be configured as an Android application environment. In some embodiments, a virtual device platform 104 hosting Android (or Security Enhancements for Android (SEAndroid)) may be created for each user using Linux's Kernel-based Virtual Machine (KVM) and Quick EMUlator (QEMU). In some embodiments, a client device 108 may be associated with one virtual device or a plurality of virtual devices. In some embodiments, a virtual device may be associated with one client device 108 or a plurality of client devices 108. One or more virtual devices may be hosted on one or more servers of the computer system 102.

Users may, for instance, utilize one or more client devices 108 to interact with one another, one or more computer systems 102, or other components of system 100. It should be noted that, while one or more operations are described herein as being performed by components of computer system 102, those operations may, in some embodiments, be performed by components of client device 108 or other components of system 100 and while one or more operations are described herein as being performed by components of client device 108, those operations may, in some embodiments, be performed by components of computer system 102 or other components of system 100.

In some embodiments, the computer system 102 (e.g., boot marker generation subsystem 114) may generate a boot identifier and a boot marker in response to a request to boot a virtual device. The boot identifier and the boot marker may be associated with the request to boot a virtual device. The loading subsystem 124 may request to boot a virtual device in response to, for example, a connection request from a client device 108. For example, a client application (hosted or loaded on the client device 108) may be associated with a virtual device and in response to a selection of such a client application (the selection may be communicated by the client device 108 to the virtual device platform 104) via, for example, a user interface of the client device 108, the loading subsystem 124 may request to boot a virtual device associated with the client device 108 (or a user of the client device 108). Alternatively, the loading subsystem 124 may request to boot a virtual device in response to a connection request from a client device 108. The request to boot a virtual device may be obtained from a source external to the computer system 102 or via an internal operation of the computer system 102.

In some embodiments, booting a virtual device may correspond to loading an operating system (e.g., Android™, Microsoft™, iOS™, etc.) associated with the virtual device and loading one or more applications associated with the loading of the operating system. For example, one or more virtual applications (e.g., applications that are hosted by or run on the computer system 102) associated with the virtual device may be loaded and such virtual applications may be accessible via a client device 108 connected to the computer system 102. In other words, in response to booting or loading a virtual device, information associated with the virtual device may be accessible via the client device 108 (e.g., via a display of the client device 108) and the client device 108 may be able to access the operating system and the virtual applications (e.g., the virtual applications may correspond to an email application, browser application, word application, excel application, or any other application supported by, for example, a client device 108) associated with the virtual device.

In some embodiments, the boot marker may include a boot identifier, which may be randomly generated and may correspond to a globally unique identifier (GUID) or a universally unique identifier (UUID). The GUID or the UUID may be represented as a 128-bit number or as 32 hexadecimal digits (e.g., in a form 8-4-4-4-12 for a total of 36 characters (32 hexadecimal characters and 4 hyphens)). A unique boot marker is generated in response to each unique request to boot a virtual device. The boot marker may also include information associated with the virtual device platform 104 (e.g., information related to services associated with the virtual device platform 104 and information identifying location of various services within the virtual device platform 104). The boot marker may include a hostname or the application programming interface (API) gateway that will be used to register a boot record (which is discussed below) and associated information that makes up the boot record. The boot marker may include a domain name system (DNS) name of the application programming interface (API) gateway. The generated boot marker may be stored in memory 106 (or database 132). In some embodiments, the boot marker (and its associated information) may be associated with an expiration time. In other words, the generated boot marker may be deleted or marked as invalid after a predetermined amount of time after the generation of the boot marker. Accordingly, the generated boot marker may only be used for a predetermined amount of time. Also, in some embodiments, when a new boot marker is generated, the newly generated boot marker may be checked (e.g., by the computer system 102) against previously generated boot markers to ensure that the newly generated boot marker is unique.

In some embodiments, the computer system 102 (e.g., first boot record generation subsystem 116) may generate a first boot record based on the boot marker. The first boot record may be generated in response to a boot request to boot a virtual device or in response to the booting of the virtual device. The first boot record may include one or more of the boot identifier (or the boot marker), a first process identifier, and a first network identifier. The first process identifier may correspond to an identifier corresponding to a process associated with the booting of the virtual device. In other words, when the loading subsystem 124 initiates the process to boot (or load) a virtual device, for example, in response to a request to boot a virtual device, this process may be associated with a unique process identifier. The new process identifier may be randomly generated by the first boot record generation subsystem 116 and may be checked (e.g., by the computer system 102) against previously generated process identifiers to ensure that the newly generated process identifier is unique. Further, the first network identifier may correspond to a network identifier associated with (or assigned to) the virtual device. In other words, the first boot record generation subsystem 116 may associate a network interface controller (e.g., of the computer system 102) with a virtual device and assign a MAC address associated with the network interface controller to the virtual device. The computer system 102 may be associated with a plurality of network interface controllers and the MAC address of each network interface controller may remain the same (e.g., the same as the MAC address primarily assigned by device manufacturers). In some embodiments, network interface controllers may support changes to their MAC addresses. It should be understood that a first boot record associated with a virtual device may include new identifiers (including new boot identifiers (or boot markers), new process identifiers, and new network identifiers) each time the virtual device is requested to be rebooted or reloaded. In other words, a particular virtual device may be associated with new identifiers based on each new boot of the virtual device.

In some embodiments, the first boot record (or any portion thereof) may be associated with an expiration time. In other words, the first boot record may be deleted after a predetermined amount of time or the first boot record may be invalidated after a predetermined amount of time. In either case, the first boot record may not be usable after the expiration time (or a predetermined amount of time after the generation of the first boot record). This is advantageous because it prevents a bad actor from being able to access and use an old boot record.

In some embodiments, the computer system 102 (e.g., second boot record generation subsystem 118) may generate a second boot record. The second boot record may be generated in response to a boot request to boot a virtual device or in response to the booting of the virtual device. The first boot record and the second boot record may be generated by different components of the computer system 102 (see FIG. 2 for a description of different components of the computer system 102) and the first boot record may be generated independent (e.g., via an independent process) of the second boot record. The second boot record may be generated in parallel to the generation of the first boot record or may be generated after the generation of the first boot record. The second boot record may include one or more of a boot identifier (e.g., generated by the boot marker generation subsystem 114) (or boot marker), a second process identifier, and a second network identifier. The second boot record generation subsystem 118 may retrieve or obtain the boot identifier (or boot marker) generated by the boot marker generation subsystem 114. Further, the second boot record generation subsystem 118 may retrieve information related to the booting of the virtual device. For example, the second boot record generation subsystem 118 may retrieve the first process identifier and the first network identifier and generate the second process identifier and the second network identifier based on the first process identifier and the first network identifier, respectively. In other words, the second boot record generation subsystem 118 may independently retrieve a boot identifier (or boot marker) generated by the boot marker generation subsystem 114, retrieve the first process identifier and the first network identifier generated by the first boot record generation subsystem 116, and generate a second boot record including one or more of a boot identifier (or boot marker), a second process identifier, and a second network identifier based on the retrieved information (e.g., the retrieved boot identifier (or boot marker), the first process identifier, and the first network identifier). It should be understood that a second boot record associated with a virtual device may include new identifiers (including new boot identifiers (or boot markers), new process identifiers, and new network identifiers) each time the virtual device is requested to be rebooted or reloaded. In other words, a particular virtual device may be associated with new identifiers based on each new boot of the virtual device.

In some embodiments, the second boot record (or a portion thereof) may be associated with an expiration time. In other words, the second boot record may be deleted after a predetermined amount of time or the second boot record may be invalidated after a predetermined amount of time. In either case, the second boot record may not be usable after the expiration time (or a predetermined amount of time after the generation of the first boot record). This is advantageous because it prevents a bad actor from being able to access and use an old boot record.

In some embodiments, the computer system 102 (e.g., boot record checking subsystem 112) may compare the first boot record and the second boot record to determine if these boot records match. Specifically, the boot record checking subsystem 112 may compare the boot identifiers (or boot markers) in the two boot records, may compare the first and second process identifiers in the two boot records, and may compare the first and second network identifiers in the two boot records. For example, the boot record checking subsystem 112 may check the boot identifiers (or boot markers) in the two boot records when comparing the two boot records. The boot record checking subsystem 112 may check whether there is an exact match between the boot identifiers (or boot markers) of the two boot records. For example, if the boot identifiers of the two boot records are 128-bit numbers, the boot record checking subsystem 112 may perform a bit by bit comparison to determine whether the boot identifiers of the two boot records match each other. The boot record checking subsystem 112 may not need to check all of the 128 bits of the two boot identifiers if the boot record checking subsystem 112 identifies that one of the bits of the boot identifier of the first boot record does not match one of the bits of the boot identifier of the second boot record. This way, computational resources could be saved. Further, the boot markers of the two boot records may also be compared to determine whether the first boot record matches the second boot record. Further, the boot record comparison may include comparing the first boot process identifier of the first boot record and the second boot process identifier of the second boot record. Also, the boot record comparison may include comparing the first network identifier of the first boot record and the second network identifier of the second boot record. In other words, comparing the first boot record and the second boot record may include comparing one or more portions of the first and second boot records. That is, comparing the first boot record and the second boot record may include comparing the boot identifier (or boot marker) in the first boot record and the boot identifier (or boot marker) in the second boot record, comparing the first process identifier in the first boot record and the second process identifier in the second boot record, and/or comparing the first network identifier in the first boot record and the second network identifier in the second boot record. In some embodiments, the boot records may be compared to each other prior to an expiration of the boot records.

In some embodiments, if the first boot record (or a portion thereof) matches (e.g., exact match) the second boot record (or a portion thereof), the boot record checking subsystem 112 will confirm that the virtual device associated with the first boot record is a trusted virtual device. In other words, if the first boot record matches the second boot record, the boot record checking subsystem 112 will confirm that a version of the operating system (or a patch level associated with the version of the operating system) that is booted or loaded (or that is being booted or loaded) is a trusted version (or a trusted patch level).

This comparison is important and is advantageous in order to prevent a bad actor from being able to load an older or different version of a virtual device (e.g., an older version of an operating system, an older patch level associated with a version of an operating system, or a vulnerable version of an operating system). If a bad actor attempts to boot or load an older or different virtual device (e.g., an older version of an operating system, an older patch level associated with a version of an operating system, or a vulnerable version of an operating system), such a virtual device will not be associated with any boot marker generated by the boot marker generation subsystem 114. In other words, although the bad actor may attempt to boot or load his/her version of the virtual device and although such a virtual device may be associated with a corresponding boot marker, process identifier, and a network identifier, such a virtual device will not be associated with any boot marker that is generated by the computer system 102 (e.g., by the boot marker generation subsystem 114). Accordingly, any boot record generated for such a virtual device (i.e., loaded or booted by the bad actor) will not match a boot record generated by, for example, the second boot record generation subsystem 118 of the computer system 102 because any boot marker of the virtual device loaded by the bad actor will not correspond to any record of a boot marker generated by the computer system 102 (e.g., by the boot marker generation subsystem 114). If the boot marker associated with the virtual device being loaded by the bad actor is not found in any record of boot markers generated by the computer system 102, the boot record checking subsystem 112 will recognize that such a virtual device is not a trusted virtual device. Additionally, the computer system 102 will also not have any record of a process identifier or network identifier associated with the virtual device booted or loaded (or attempted to be booted or loaded) by the bad actor. Accordingly, generating separate boot records and checking the boot records against each other helps identify whether the virtual device (that is being booted or loaded) is a trusted virtual device. Once the virtual device (that is being booted or loaded) has been determined to be a trusted virtual device, the computer system 102 may allow the virtual device (that is being booted or loaded) to access a key(s) (e.g., stored in a data partition of memory 106) for performing cryptographic operations. In other words, computer system 102 allows keys to be accessed in order to allow a virtual device (that is booted or being booted) to perform cryptographic operations. However, if a virtual device (that is being booted or loaded) is deemed to be an untrusted virtual device, the computer system 102 may then prevent such a virtual device from accessing keys for performing cryptographic operations. In other words, the computer system 102 facilitates boot-specific key access to allow a trusted virtual device to perform cryptographic operations using the keys. This is described in more detail below.

Further, in some embodiments, if the first boot record matches the second boot record (e.g., if the boot marker, first process identifier, and/or the first network identifier in the first boot record match the boot marker, second process identifier, and/or the second network identifier in the second boot record, respectively), a credential (e.g., dynamic credential, a dynamic password, a one-time password (OTP), or a one-time pin) may be obtained from the certificate provisioning subsystem 120. In other words, the certificate provisioning subsystem 120 may issue a credential in response to an indication that the first boot record matches the second boot record. Although the certificate provisioning subsystem 120 has been illustrated as being a part of the virtual device platform 104, it should be understood that such a subsystem may be external to the virtual device platform 104 (or the computer system 102) and may be accessible by the virtual device platform 104 (or the computer system 102) via the network 152 (or any other network). The credential may be valid only for one login session or transaction and therefore, is advantageous over traditional (static) password-based authentication. In other words, an important advantage that is addressed by dynamic credentials is that (in contrast to static passwords) they are not vulnerable to replay attacks. This means that a potential bad actor (e.g., a potential intruder) who manages to record a dynamic credential that was already used to log into a service or to conduct a transaction will not be able to abuse the dynamic credential, since the dynamic credential will no longer be valid after its initial use. Further, the dynamic credential is issued by the certificate provisioning subsystem 120 only when the first boot record matches the second boot record, thereby reducing (or eliminating) the chances of a potential bad actor gaining access to a new dynamic credential and reducing (or eliminating) the chances of a potential bad actor being able to trick the certificate provisioning subsystem 120 to issue a new dynamic credential.

In some embodiments, a digital certificate (also referred to as an identity certificate or a public key certificate) and a key pair (e.g., private and public keys) may be obtained based on the dynamic credential. Specifically, the certificate provisioning subsystem 120 may issue a digital certificate based on the obtained dynamic credential. Further, the key pair may be issued by the certificate provisioning subsystem 120 based on the obtained dynamic password or the key pair may be retrieved from memory 106 based on the obtained dynamic password. Alternatively, a digital certificate (also referred to as an identity certificate or a public key certificate) and a key pair (e.g., private and public keys) may be obtained in response to a match between the first boot record and the second boot record. Specifically, the certificate provisioning subsystem 120 may issue a digital certificate in response to a match between the first boot record and the second boot record. Further, the key pair may be issued by the certificate provisioning subsystem 120 in response to a match between the first boot record and the second boot record or the key pair may be retrieved from memory 106 in response to a match between the first boot record and the second boot record. Alternatively, in some embodiments, another subsystem (not shown) of the computer system 102 may generate a key pair (e.g., a public and private key) in response to a match between the first boot record and the second boot record.

In some embodiments a new digital certificate and a new key pair are generated for every boot of the virtual device, and accordingly, the digital certificate and key pair may be boot-specific. In other words, the certificate provisioning subsystem 120 may issue or generate a new digital certificate and a key pair associated with each new boot (or reboot) of a particular virtual device. In some embodiments, although a new digital certificate may be generated for every boot of the virtual device, keys (e.g., stored in memory 106) may be retrieved or obtained in response to a match between the first boot record and the second boot record or based on the dynamic credential. Alternatively, in some embodiments, another subsystem (not shown) of the computer system 102 may generate a key pair (e.g., a public and private key) in response to a match between the first boot record and the second boot record and the certificate provisioning subsystem 120 may obtain the generated key and may issue a digital certificate including information associated with such a key. In some embodiments, the digital certificate may include the key pair and, in some embodiments, the digital certificate may not include the key pair.

The digital certificate may include information about the virtual device (e.g., GUID of the virtual device, name of the virtual device, version of the virtual device, patch level of the version of the virtual device), information about the key (e.g., a public key and information about the public key associated with the virtual device and its expiration date), information about an entity that verified the certificate's content (e.g., the certificate issuer's name), the certificate issuer's digital signature, information associated with a user or organization associated with a virtual device, (e.g., email address associated with the user or organization, name or GUID of the user or organization associated with the virtual device), expiration time associated with the digital certificate, etc. The certificate provisioning subsystem 120 may utilize a Simple Certificate Enrollment Protocol (SCEP), Network Device Enrollment Service (NDES), or Enrollment over Secure Transport (EST) protocol for issuing digital certificates.

In some embodiments, the generated digital certificate and/or keys may be associated with an expiration time. In other words, the digital certificate and/or keys may be deleted after a predetermined amount of time or the digital certificate and/or keys may be invalidated after a predetermined amount of time. In either case, the digital certificate and/or keys may not be usable after the expiration time (or a predetermined amount of time after the generation of the first boot record). This is advantageous because it prevents a bad actor from being able to access and use an old digital certificate and/or keys.

In some embodiments, the token generation subsystem 122 may generate an authentication token based on the digital certificate or in response to a request for an authentication token. For example, the authentication token may include information associated with the issued digital certificate noted above, information about the public key, identity information of the virtual device (e.g., GUID associated with the virtual device), identify information of a user or organization associated with the virtual device (e.g., email address associated with the user or organization, name or GUID of the user or organization associated with the virtual device), identity information of the virtual device platform 104, version number and patch level of the operating system associated with the virtual device, expiration time associated with the authentication token, etc. The virtual device platform 104 may send the authentication token and/or the digital certificate to the cryptographic processor 128 (e.g., HSM). The authentication token and/or digital certificate may be sent in order to request the cryptographic processor 128 to grant the virtual device access to one or more keys (e.g., a key (or key pair) generated by the certificate provisioning subsystem 120 or another key (or key pair) stored in memory 106 (or database 132)) and to allow the virtual device to use the one or more keys for cryptographic operations in the virtual device platform 104. The cryptographic processor 128 may review the authentication token and/or the digital certificate (and the information contained in the authentication token and/or the digital certificate), may compare the information (e.g., GUID) included in the digital certificate and the authentication token, and may authorize the virtual device to access and use the key(s) for cryptographic operations if the cryptographic processor 128 recognizes a valid digital certificate and/or in response to a match between the information (e.g., GUID) included in the digital certificate and the authentication token.

In other words, the cryptographic processor 128 obtains the authentication token and/or the digital certificate, reviews the digital certificate and/or the authentication token, determines whether the digital certificate is a valid certificate (including, for example, whether the digital certificate has expired and/or has been invalidated or revoked) and/or determine whether the information (e.g., GUID) included in the digital certificate matches the information (e.g., GUID) included in the authentication token, and authorizes the virtual device to use (or access) the key for performing cryptographic operations in the virtual device platform 104 in response to a determination that the digital certificate is valid and/or in response to a determination that the information (e.g., GUID) included in the digital certificate matches the information (e.g., GUID) included in the authentication token. The virtual device platform 104 may obtain, from the cryptographic processor 128, authorization to access and use the key(s) in response to an acceptance (or verification) of the digital certificate and/or verification that the information included in the digital certificate matches the information included in the authentication token by the cryptographic processor 128. In some embodiments, the authentication token and/or digital certificate may be verified by the cryptographic processor 128 prior to an expiration of the authentication token and/or an expiration of the digital certificate.

In some embodiments, the digital certificate may be sent by the virtual device platform 104 to the cryptographic processor 128 to authenticate the connection between the virtual device platform 104 and the cryptographic processor 128. In some embodiments, the cryptographic processor 128 may validate the digital certificate by, for example, determining whether the digital certificate has been signed by a trusted certificate authority, whether the digital certificate has not expired, and/or whether the digital certificate has not been invalidated or revoked. In response to validating the digital certificate, the virtual device platform 104 may establish a connection with the cryptographic processor 128. Further, in some embodiments, the virtual device platform 104 may send the authentication token to the cryptographic processor 128 (e.g., either in response to a request or query from the cryptographic processor 128 or in response to a generation of the authentication token). The cryptographic processor 128 may obtain the authentication token, retrieve information (e.g., GUID) from the authentication token, compare the information included the authentication token to the information (e.g., GUID) included in the digital certificate. In response to a match between the information (e.g., GUID) included the authentication token and the information (e.g., GUID) included in the digital certificate, the cryptographic processor may allow or permit the virtual device (e.g., the virtual device that is booted or being booted) to access keys (e.g., persistent keys stored in memory 106), such that the virtual device may perform cryptographic operations using the keys. Such cryptographic operations may be performed by the cryptographic processor 128. The keys (e.g., created by the cryptographic processor 128) that are accessed to perform cryptographic operations may be different from the keys generated by the certificate provisioning subsystem 120. The keys to perform cryptographic operations may include different keys for different operations or applications. For example, keys (for performing cryptographic operations) associated with an email application may be different from keys (for performing cryptographic operations) associated with a messaging application.

Alternatively, in some embodiments, the virtual device platform 104 may send the digital certificate to the cryptographic processor 128 (e.g., HSM). The digital certificate may be sent in order to request the cryptographic processor 128 to grant the virtual device access to the key and to allow the virtual device to use one or more keys (e.g., a key (or key pair) generated by the certificate provisioning subsystem 120 or another key (or key pair) stored in memory 106 (or database 132)) for cryptographic operations in the virtual device platform 104. The cryptographic processor 128 reviews the digital certificate and authorizes the virtual device to access and use the key for cryptographic operations if the cryptographic processor 128 recognizes a valid digital certificate (including, for example, recognizing that the digital certificate has not expired and/or has not been invalidated or revoked). In other words, the cryptographic processor 128 obtains the digital certificate, reviews the digital certificate, determines whether the digital certificate is a valid certificate, and authorizes the virtual device to use (or access) one or more keys for performing cryptographic operations in the virtual device platform 104 in response to a determination that the digital certificate is valid. The virtual device platform 104 may obtain, from the cryptographic processor 128, authorization to access and use the key in response to an acceptance (or verification) of the digital certificate by the cryptographic processor 128. This way, the computer system 102 facilitates boot-specific access (or boot-specific use) of keys by a trusted virtual device (that is booted or being booted) in order for the trusted virtual device to perform cryptographic operations using one or more keys. In some embodiments, the identity certificate may be verified by the cryptographic processor 128 prior to an expiration of the identity certificate.

In some embodiments, the authentication token may be associated with an expiration time. In other words, the authentication token may be deleted after a predetermined amount of time or the authentication token may be invalidated (or rendered invalid) after a predetermined amount of time. In either case, the authentication token may not be usable after the expiration time (or a predetermined amount of time after the generation of the first boot record). This is advantageous because it prevents a bad actor from being able to access and use an old authentication token.

Even if a bad actor attempts to use an older digital certificate in order to gain access (or to use) a key, the bad actor will be unable to do so for several reasons. First, the digital certificate may include information associated with the virtual device (e.g., a version of an operating system associated with the virtual device or a patch level of an operating system associated with the virtual device, an identification or name associated with the virtual device) that is being loaded and the bad actor's attempt to request access to (or use of) a key for another virtual device (e.g., another version of an operating system associated with the virtual device, another patch level of an operating system associated with the virtual device, or another operating system) will be rejected by the cryptographic processor 128 since the other virtual device information does not correspond to the information associated with the virtual device in the digital certificate. Second, the cryptographic processor 128 may keep a record of digital certificates that it has received and reviewed. Based on this, the cryptographic processor 128 may reject the reuse of a previously used digital certificate (e.g., by comparing an identification associated with the digital certificate and comparing it to previously used identifications associated with previously used digital certificates). Third, as noted above, each digital certificate (or authentication token) may be associated with an expiration time. In other words, the digital certificate (or authentication token) may be deleted after a predetermined amount of time or the digital certificate (or authentication token) may be invalidated (or rendered invalid) after a predetermined amount of time. In either case, the digital certificate (or authentication token) may not be usable after the expiration time (or a predetermined amount of time after the generation of the digital certificate (or authentication token)). If the digital certificate has expired or is otherwise not usable, the cryptographic processor 128 will reject the digital certificate and notify the virtual device infrastructure 202 of such a rejection.

In some embodiments, the virtual device platform 104 may provide several notifications. For instance, when the first boot record does not match a second boot record, the boot record checking subsystem 112 may issue a notification indicating that the boot records do not match. This notification may be provided to, for example, an administrator (or a plurality of administrators) of the computer system 102 and such a notification may indicate that there may be a bad actor attempting to load for example, an older version of a virtual device. Accordingly, such a notification allows such a situation to be rectified sooner than later. Further, when a digital certificate is rejected by the cryptographic processor 128, a notification may be issued to indicate the rejection of a digital certificate. This notification may be provided to, for example, an administrator (or a plurality of administrators) of the computer system 102 and such a notification may indicate that there may be a bad actor attempting to use for example, a previously used digital certificate or a digital certificate that has not been generated by the computer system 102. Further, for example, if the information included in the digital certificate doesn't match the information included in the authentication token, the cryptographic processor 128 may issue a notification indicating this. This notification may be provided to, for example, an administrator (or a plurality of administrators) of the computer system 102 and such a notification may indicate that there may be a bad actor attempting to use for example, a previously used authentication token or an authentication token that has not been generated by the computer system 102.

In some embodiments, the keys generated by the certificate provisioning subsystem 120 may not be persisted and may be temporary. In other words, the keys generated by the certificate provisioning subsystem 120 may only be created or generated in response to a request to boot a virtual device and in response to a determination that the virtual device is a trusted virtual device and these keys may be deleted, removed, or invalidated (or rendered invalid) in response to a reboot (or a reload) or a shutdown of a virtual device. That is, the keys generated by the certificate provisioning subsystem 120 may be boot-specific since they may be generated when a virtual device is being booted (or in response to a request to boot a virtual device) and when the virtual device is determined to be trusted and may be deleted, removed, or invalidated (or rendered invalid) when the trusted virtual device is shutdown or is rebooted (or reloaded). In other words, new keys may be generated or issued in response to a request to boot a virtual device and in response to a determination that the virtual device is a trusted virtual device. Accordingly, computer system 102 may facilitate generation of dynamic keys in response to a request to boot a virtual device and in response to a determination that the virtual device is a trusted virtual device (e.g., in response to a determination that a first boot record matches the second boot record). This is advantageous because it prevents the keys from being used by bad actors for gaining access to the cryptographic processor 128 and for gaining access to keys (e.g., stored in memory 106) that are used for performing cryptographic operations. Deleting or removing the key may include deleting a pointer to the memory space storing the key as well as overwriting of the memory space where is key is stored (e.g. writing over the memory space where the key is stored so that the key can never be retrieved again). Accordingly, the keys (e.g., stored in memory 106) that are used for performing cryptographic operations may only be accessed via the boot-specific operations discussed above. As noted above, the keys that are used to perform cryptographic operations may be different from the keys generated or issued by the certificate provisioning subsystem. In fact, the keys that are used to perform cryptographic operations may be generated or issued by the cryptographic processor 128, may be persisted, and may be stored in memory 106. On the other hand, the keys generated or issued by the certificate provisioning subsystem 120 may be temporary (e.g., ephemeral, not persisted) and may be used for obtaining access to the persisted keys stored in memory 106.

The above description (and the description below) helps determine whether the virtual device (which is booted or being booted) is a trusted virtual device and helps facilitate boot-specific key access such that the trusted virtual device (e.g., an operating system associated with the virtual device or virtual applications associated with the virtual device) is allowed to access and use one or more keys for performing cryptographic operations to communicate information within the computer system 102 and outside the computer system 102. It should be understood that the cryptographic processor 128 may be used to perform encryption and decryption functions for the virtual device using the keys. In other words, after authorizing a virtual device to access and use the keys, the cryptographic processor 128 may help facilitate the encryption and decryption operations for the virtual device. Although this description has been described with regard to boot-specific key access to perform cryptographic operations, it should be understood that the described operations may be relevant to other operations or services. In other words, in addition to securing access to the services of the cryptographic processor 128, the described operations can be used to secure access to other services (e.g., system update service, data synchronization service, etc.). That is, the described operations can be used for provisioning identity and securing communications to any entity (e.g., in addition to the described operations being used for provisioning identity and securing communications to the cryptographic processor 128).

In addition, in some embodiments, external security tokens may be used as added security in order to prevent a bad actor from using a key to perform cryptographic operations. For instance, the cryptographic processor 128 may obtain an external security token (e.g., YubiKey™, RSA SecurID™, Titan Security Key™, etc.) from the client device 108. The client device 108 may obtain the external security token from, for example, an external authentication device 110 and a user may input such an authentication token via a user interface (e.g., display subsystem 144) of the client device 108. Alternatively, or additionally, the client device 108 may host a client application that generates the external security token. The client device 108 may send the external security token to the cryptographic processor 128 or the client device 108 may communicate the external security token to the virtual device platform 104 and the virtual device platform 104 may then communicate the external security token to the cryptographic processor 128. The authentication subsystem 142 of the client device 108 may obtain the external security token. Additionally, the authentication subsystem 142 may also be used to authenticate a user of the client device 108. For instance, the authentication subsystem 142 may request a user for a pin or password or a biometric input in order allow a user to access the client device 108.

In some embodiments, the cryptographic processor 128 may review the obtained external security token (in addition to reviewing the digital certificate (or the authentication token (and the information contained in the authentication token))) and authorize the virtual device to access and use one or more keys for cryptographic operations if the cryptographic processor 128 recognizes a valid external security token (in addition to recognizing a valid digital certificate and/or in addition to validating the authentication token). In other words, the cryptographic processor 128 may obtain the digital certificate (and/or authorization token) and the external security token, review the digital certificate (and/or authentication token) and review the external security token, determine whether the digital certificate is a valid certificate (and/or determine whether the authentication token is a valid token) and whether the external security token is valid, and authorize the virtual device to use (or access) one or more keys for cryptographic operations in response to a determination that the digital certificate (and/or the authentication token) and the external security token are valid.

In some embodiments, the cryptographic processor 128 may send the virtual device platform 104 an authorization to access and use one or more keys (e.g., authorization to allow a virtual device to access and use one or more keys for cryptographic operations) in response to an acceptance (or verification) of the digital certificate (and/or authentication token) and in response to an acceptance (or verification) of the external security token by the cryptographic processor 128. In some embodiments, the digital certificate (and/or authentication token) and the external security token may be associated with a corresponding expiration time.

It may be advantageous to authorize access to one or more keys (e.g., authorization to allow the virtual device to access and use the one or more keys for cryptographic operations) in response to a verification of an external security token provided by the client device 108. For instance, a bad actor having access to the client device 108 may also obtain access to the virtual device and the operations performed by the virtual device. In order to avoid a bad actor from performing actions that may be detrimental to the virtual device, the external security tokens are an added advantage to ensure that the bad actor cannot perform actions that may be detrimental to the virtual device simply by gaining access to the client device 108. In other words, without the external security token, the bad actor would be unable to gain access to (or use) the one or more keys for performing cryptographic operations.

FIGS. 2-6 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 2:
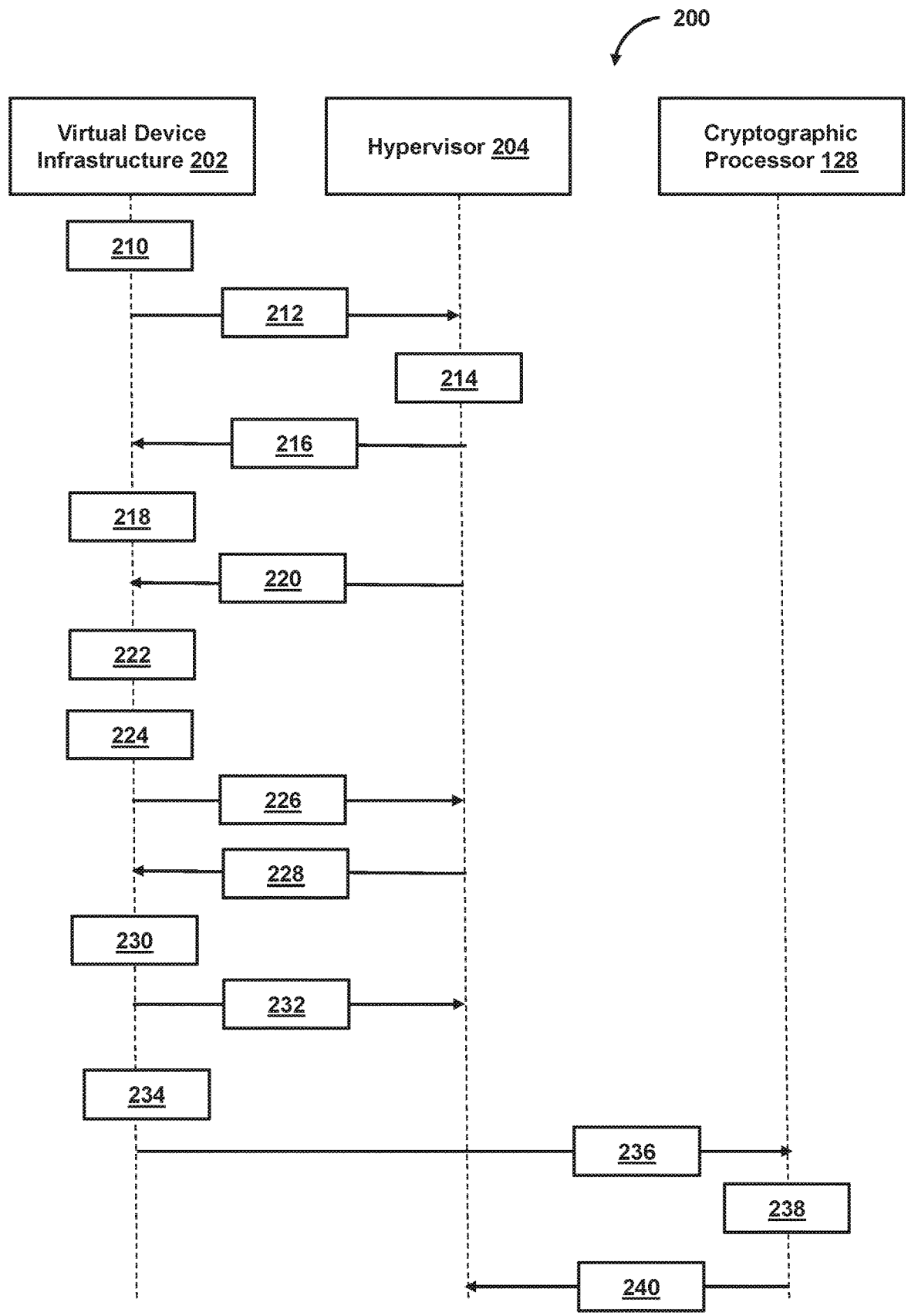
FIG. 2 shows a method performed by different components of the virtual device platform for facilitating boot-specific key access to perform cryptographic operations, in accordance with one or more embodiments.

FIG. 2 shows a method 200 performed by different components of the virtual device platform for facilitating boot-specific key access to perform cryptographic operations. The virtual device infrastructure 202 (or virtual device manager 202) and the hypervisor 204 may correspond to different components of the virtual device platform 104 and the cryptographic processor 128 may correspond to a component of the computer system 102. However, as noted above, the cryptographic processor 128 may be external to the computer system 102 (or the virtual device platform 104) and may communicate with the computer system 102 (or the virtual device platform 104) via a network. One or more subsystems illustrated in FIG. 1 (and described above with regard to FIG. 1) may correspond to one or more subsystems of the virtual device infrastructure 202 or hypervisor 204.

In step 210, the virtual device infrastructure 202 may generate a boot identifier and a boot marker in response to a request to boot a virtual device and such a boot marker (which may include the boot identifier) may be stored in a memory associated with the virtual device infrastructure 202. For example, an agent of the virtual device infrastructure 202 may generate the boot identifier and the boot marker. The boot identifier and the boot marker may be generated in response to a request to boot a virtual device. The request to boot a virtual device may be generated by the virtual device infrastructure 202 in response to a request from a client device 108. For example, a client application (hosted or loaded on the client device 108) may be associated with a virtual device and in response to a selection of such a client application (the selection may be communicated by the client device 108 to the virtual device infrastructure 202) via, for example, a user interface of the client device 108, the virtual device infrastructure 202 may generate a request to boot a virtual device associated with the client device 108 (or a user of the client device 108). Alternatively, the virtual device infrastructure 202 may generate a request to boot a virtual device in response to a connection request from a client device 108. Alternatively, a request to boot a virtual device may be obtained from the client device 108 in response to a connection request from the client device 108. The request to boot a virtual device may be obtained from a source external to the computer system 102 or via an internal operation of the computer system 102 (e.g., the request to boot a virtual device may be generated or initiated by the virtual device infrastructure 202).

As noted above, the boot marker may include the boot identifier and the boot identifier may be randomly generated and may correspond to a globally unique identifier (GUID) or a universally unique identifier (UUID). The boot marker may also include information associated with the virtual device infrastructure 202 (e.g., information related to services associated with the virtual device infrastructure 202 and information identifying location of various services within the virtual device infrastructure 202) and other information discussed above with regard to FIG. 1. In some embodiments, the boot marker (and its associated information) may be associated with an expiration time. In other words, the generated boot marker may be deleted or marked as invalid (e.g., by the virtual device infrastructure 202) after a predetermined amount of time after the generation of the boot marker. Accordingly, the generated boot marker may only be used for a predetermined amount of time. Also, in some embodiments, when a new boot marker is generated, the newly generated boot marker may be checked (e.g., by virtual device infrastructure 202) against previously generated boot markers to ensure that the newly generated boot marker is unique.

In step 212, the virtual device infrastructure 202 may convey the boot marker and the request to boot a virtual device to the hypervisor 204. The hypervisor 204 may create and run virtual devices. In response to obtaining the boot marker (and/or in response to the request to boot a virtual device), the hypervisor, in step 214 may generate a first boot record based on the boot marker and may boot (or load) the virtual device (or start the process to boot or load the virtual device). The first boot record may include one or more of the boot identifier (or the boot marker), a first process identifier, and a first network identifier. The first process identifier may correspond to an identifier corresponding to a process of the hypervisor 204 to boot a virtual device and the first process identifier may be associated with a unique process identifier. Further, the first network identifier may correspond to a network identifier associated with (or assigned to) the virtual device. In some embodiments, the hypervisor 204 may associate a network identifier with (or assign a network identifier to) the virtual device or the virtual device infrastructure 202 may associate a network identifier with (or assign a network identifier to) the virtual device. In a scenario where the virtual device infrastructure 202 associates a network identifier with (or assigns a network identifier to) the virtual device, the virtual device infrastructure 202 may convey information associated with such a network device identifier to the hypervisor 204 in step 212. The first boot record (or a portion thereof) generated by the hypervisor 204 may be associated with an expiration time. In step 214, the hypervisor 204 may store the first boot record in a memory 106 associated with the hypervisor 204.

In step 216, the hypervisor 204 may convey the first process identifier to the virtual device infrastructure 202 in response to a request to convey the first process identifier from the virtual device infrastructure 202 or the virtual device infrastructure 202 may retrieve the first process identifier from memory in step 216. Alternatively, since an agent of the virtual device infrastructure 202 may be involved in setting up the environment for the hypervisor 204 before the hypervisor 204 starts, the virtual device infrastructure may know the first process identifier associated with the process of the hypervisor 204 to boot a virtual device. In some embodiments, the hypervisor 204 may convey the first network identifier to the virtual device infrastructure 202 in response to a request to convey the first network identifier from the virtual device infrastructure 202 or the virtual device infrastructure 202 may retrieve the first network identifier from memory in step 216. In step 218, the virtual device infrastructure 202 may generate a second boot record independent of the generation of the first boot record. The second boot record may be generated in parallel to the generation of the first boot record or after the generation of the first boot record. The second boot record may be generated in response to a boot request to boot a virtual device or in response to the booting of the virtual device. The second boot record may include one or more of a boot identifier (e.g., generated by the virtual device infrastructure 202 in step 210) (or a boot marker generated by the virtual device infrastructure 202 in step 210), a second process identifier, and a second network identifier. The virtual device infrastructure 202 may generate the second process identifier and the second network identifier based on the first process identifier and the first network identifier, respectively, obtained or retrieved in step 216. In other words, the virtual device infrastructure 202 may independently retrieve a boot identifier (or boot marker) generated by the virtual device infrastructure 202 in step 210, retrieve or obtain the first process identifier and the first network identifier, and generate a second boot record including a boot identifier (or boot marker), a second process identifier, and the second network identifier based on the retrieved or obtained information (e.g., the retrieved or obtained boot identifier (or boot marker), the first process identifier, and the first network identifier). The second boot record (or a portion thereof) generated by the virtual device infrastructure 202 may be associated with an expiration time. As described above, the first and second boot records are independently generated by different components of the virtual device platform 104.

In step 220, the virtual device infrastructure 202 may obtain the first boot record from the hypervisor 204. In step 220, the hypervisor 204 may also request the virtual device infrastructure for a credential (e.g., dynamic credential, a dynamic password, a one-time password (OTP), or a one-time pin) and/or a digital certificate. In step 222, the virtual device infrastructure 202 may compare the first boot record and the second boot record to determine if these boot records match. Specifically, the virtual device infrastructure 202 may compare the boot identifiers (or boot markers) in the two boot records, may compare the first and second process identifiers in the two boot records, and may compare the first and second network identifiers in the two boot records. For example, the virtual device infrastructure 202 may check the boot identifiers (or boot markers) in the two boot records when comparing the two boot records. The virtual device infrastructure 202 may check whether there is an exact match between the boot identifiers (or boot markers) of the two boot records. For example, if the boot identifiers of the two boot records are 128-bit numbers, the virtual device infrastructure 202 may perform a bit by bit comparison to determine whether the boot identifiers of the two boot records match each other. The virtual device infrastructure 202 may not need to check all of the 128 bits of the two boot identifiers if the virtual device infrastructure 202 identifies that one of the bits of the boot identifier of the first boot record does not match one of the bits of the boot identifier of the second boot record. This way, computational resources could be saved. Further, the boot markers of the two boot records may also be compared to determine whether the first boot record matches the second boot record. Further, the boot record comparison may include comparing the first boot process identifier of the first boot record and the second boot process identifier of the second boot record. Also, the boot record comparison may include comparing the first network identifier of the first boot record and the second network identifier of the second boot record. In other words, comparing the first boot record and the second boot record may include comparing one or more portions of the first and second boot records. That is, comparing the first boot record and the second boot record may include comparing the boot identifier (or boot marker) in the first boot record and the boot identifier (or boot marker) in the second boot record, comparing the first process identifier in the first boot record and the second process identifier in the second boot record, and/or comparing the first network identifier in the first boot record and the second network identifier in the second boot record.

If the first boot record (or a portion thereof) matches (e.g., an exact match) the second boot record (or a portion thereof), the virtual device infrastructure 202 will confirm that the virtual device associated with the first boot record (e.g., the virtual device being booted by the hypervisor 204) is a trusted virtual device. In other words, if the first boot record matches the second boot record, the virtual device infrastructure 202 will confirm that a version of the operating system (or a patch level associated with the version of the operating system) that is being loaded (or booted) is a trusted version (or a trusted patch level).

As noted above, this comparison is important and is advantageous in order to avoid a bad actor from being able to load an older or different version of a virtual device (e.g., an older version of an operating system, an older patch level associated with a version of an operating system, or a vulnerable version of an operating system). If a bad actor attempts to boot or load an older or different virtual device (e.g., an older version of an operating system, an older patch level associated with a version of an operating system, or a vulnerable version of an operating system) via the hypervisor 204, such a virtual device will not be associated with the boot marker generated by the virtual device infrastructure 202. In other words, although the bad actor may attempt to boot or load his/her version of the virtual device using the hypervisor 204 and although such a virtual device may be associated with a corresponding boot marker, process identifier, and a network identifier, such a virtual device will not be associated with the boot marker that is generated by virtual device infrastructure 202. Accordingly, any boot record generated for such a virtual device (i.e., loaded or booted by the bad actor) will not match a boot record generated by the virtual device infrastructure 202 because any boot marker of the virtual device loaded by the bad actor will not correspond to any record of a boot marker generated by the virtual device infrastructure 202. If the boot marker associated with the virtual device being loaded by the bad actor is not found in any record of boot markers generated by the virtual device infrastructure 202, the virtual device infrastructure 202 will recognize that such a virtual device is not a trusted virtual device. Additionally, the virtual device infrastructure 202 will also not have any record of a process identifier or network identifier associated with the virtual device booted or loaded (or being booted or loaded) by the bad actor. Accordingly, generating separate boot records and checking the boot records against each other helps identify whether the virtual device (that is being booted or loaded) is a trusted virtual device (e.g., whether the virtual device that is being booted is being booted in response to a request to boot from a virtual device infrastructure 202 or whether the virtual device that is being booted is being booted in response to an action by a bad actor).

In step 224, in response to a request from the hypervisor 204 (in step 220) for a credential and/or in response to a match between the first boot record and the second boot record, the virtual device infrastructure 202 may request a certificate provisioning service (which may be external to the virtual device infrastructure 202) to provide a dynamic credential and may obtain the dynamic password from the certificate provisioning service. Alternatively, the virtual device infrastructure 202 may include a certificate provisioning service, and in response to a request from the hypervisor 204 for a dynamic credential and/or in response to a match between the first boot record and the second boot record, the virtual device infrastructure 202 may request the certificate provisioning service for a dynamic credential and may obtain a dynamic credential generated or issued by the certificate provisioning service.

In step 226, the dynamic credential may be conveyed to the hypervisor 204 in response to the request for a dynamic credential in step 220 or in response to a match between the first boot record and the second boot record. As noted above, the dynamic credential is valid only for one login session or transaction and therefore, is advantageous over traditional (static) password-based authentication. In other words, an important advantage that is addressed by dynamic credentials is that (in contrast to static passwords) they are not vulnerable to replay attacks. This means that a potential bad actor (e.g., a potential intruder or hacker) who manages to record a dynamic credential that has already been used to log into a service or to conduct a transaction will not be able to abuse the dynamic credential, since the dynamic credential will no longer be valid after its initial use. Further, the dynamic credential is issued by the certificate provisioning service only when the first boot record matches the second boot record, thereby reducing (or eliminating) the chances of a potential bad actor gaining access to a new dynamic credential and reducing (or eliminating) the chances of a potential bad actor being able to trick the certificate provisioning service to issue a new dynamic credential. The dynamic credential may be associated with an expiration time. In other words, a dynamic credential may not be used to obtain an identity certificate or key pair after a predetermined amount of time has elapsed after the generation of the dynamic credential. Associating the dynamic credential with an expiration time also reduces the chances of a bad actor being able to use the dynamic credential.

In step 228, in response to obtaining the dynamic credential, the hypervisor 204 may request the virtual device infrastructure 202 to issue or generate a digital certificate. The request in step 228 may include the dynamic credential and the dynamic credential may be used to authenticate the hypervisor 204 and to generate a digital certificate. As noted above, the virtual device infrastructure 202 may include a certificate provisioning service, the virtual device infrastructure 202 may request such a certificate provisioning service to issue or generate a digital certificate and a key pair, and such a certificate provisioning service may issue or generate (in step 230) a digital certificate (also referred to as an identity certificate or a public key certificate) and a key pair (e.g., private and public keys) based on the obtained dynamic credential (e.g., based on a verification of the dynamic credential). As a result, the virtual device infrastructure 202 may obtain a digital certificate and a key pair. Alternatively, the certificate provisioning service may be external to the virtual device infrastructure 202 and the virtual device infrastructure 202 may request the certificate provisioning service for a digital certificate and a key pair based on the dynamic credential and may obtain a digital certificate and a key pair (generated or issued by the certificate provisioning service based on the dynamic credential (e.g., based on a verification of the dynamic credential)) from the certificate provisioning service. In some embodiments, the key pair may be retrieved from memory 106 based on the obtained dynamic credential (e.g., based on a verification of the dynamic credential) as opposed to being generated or issued by the certificate provisioning service. In some embodiments, the key pair may be generated or issued by the hypervisor 204 and in step 228, the hypervisor may request the virtual device infrastructure 202 to generate a digital certificate and in the same request the hypervisor 204 may inform the virtual device infrastructure 202 of the key (e.g., public key) generated by the hypervisor 204.

Alternatively, in step 230, the certificate provisioning service associated with the virtual device infrastructure 202 may issue or generate a digital certificate and a key pair in response to a match between the first boot record and the second boot record. In other words, in step 220 (or step 228) the hypervisor 204 may convey the first boot record and may request a digital certificate and/or key pair. In response to a match between the first boot record and the second boot record, the certificate provisioning service associated with the virtual device infrastructure 202 may issue or generate a digital certificate and a key pair in step 230. In some embodiments, the key pair may be retrieved from memory 106 response to a match between the first boot record and the second boot record as opposed to being generated or issued by the certificate provisioning service. Alternatively, in some embodiments, the hypervisor 204 may generate a key pair and may provide a key (e.g., public key) to the virtual device infrastructure 202 (e.g., in step 220 or 228). This key pair may be generated in response to a match between the first boot record and the second boot record. Step 220 or 228 may also include a request by the hypervisor 204 to issue a digital certificate. In step 230, the certificate provisioning service associated with the virtual device infrastructure 202 may issue or generate a digital certificate (including information associated with a key (e.g., public key) generated by the hypervisor 204) in response to a match between the first boot record and the second boot record.

In some embodiments a new digital certificate and a new key pair are generated for every boot of the virtual device, and accordingly, the digital certificate and key pair may be boot-specific. In other words, for example, the certificate provisioning service may issue a new digital certificate and a key pair associated with each new boot (or reboot) of a particular virtual device. In some embodiments, although a new digital certificate may be generated for every boot of the virtual device, keys (e.g., stored in memory 106) may be retrieved or obtained in response to a match between the first boot record and the second boot record or based on the dynamic credential. In some embodiments, the digital certificate may include the key pair and, in some embodiments, the digital certificate may not include the key pair. In some embodiments, the hypervisor 204 may track the expiration of the digital certificate and prior to an expiration of the digital certificate (e.g., a threshold time prior to an expiration of the digital certificate) may request the virtual device infrastructure 202 to issue a new digital certificate. However, if the virtual device is rebooted prior to an expiration of the digital certificate, a new digital certificate will generated in response to a new boot of the virtual device.

The digital certificate may include information about the virtual device (e.g., GUID of the virtual device, name of the virtual device, version of the virtual device, patch level of the version of the virtual device), information about the key (e.g., a public key and information about the public key associated with the virtual device and its expiration date), information about an entity that verified the certificate's content (e.g., the certificate issuer's name), the certificate issuer's digital signature, information associated with a user or organization associated with a virtual device, (e.g., email address associated with the user or organization, name or GUID of the user or organization associated with the virtual device), expiration time associated with the digital certificate, etc. The certificate provisioning service may utilize a Simple Certificate Enrollment Protocol (SCEP), Network Device Enrollment Service (NDES), or Enrollment over Secure Transport (EST) protocol for issuing digital certificates. In some embodiments, the generated digital certificate may be associated with an expiration time. In step 232, the virtual device infrastructure 202 may convey the digital certificate and the key pair to the hypervisor 204. Alternatively, if the hypervisor 204 has generated the key pair, the virtual device infrastructure 202 may convey the digital certificate to the hypervisor in step 232.

In step 234, the virtual device infrastructure 202 may generate an authentication token based on the digital certificate. For example, the authentication token may include information associated with the issued digital certificate noted above, information about the public key, identity information of the virtual device (e.g., GUID associated with the virtual device), identify information of a user or organization associated with the virtual device (e.g., email address associated with the user or organization, name or GUID of the user or organization associated with the virtual device), identity information of the virtual device infrastructure 202, version number and patch level of the operating system associated with the virtual device, expiration time associated with the authentication token, etc. Alternatively, or additionally, step 234 may be performed by the hypervisor 204. In other words, the hypervisor 204 may generate an authentication token based on the digital certificate.

In step 236, the virtual device infrastructure 202 may send the digital certificate and/or authentication token to the cryptographic processor 128, along with a request to grant the virtual device access to one or more keys (e.g., a key (or key pair) generated by the certificate provisioning subsystem 120 or another key (or key pair) stored in memory 106 (or database 132)) to perform cryptographic operations. The authentication token and/or the digital certificate may be sent in order to request the cryptographic processor 128 to grant the virtual device access to the one or more keys and to allow the virtual device to use the one or more keys for cryptographic operations. In step 238, the cryptographic processor 128 reviews (or verifies) the authentication token and/or the digital certificate (and the information contained in the authentication token and/or digital certificate), compares the information (e.g., GUID) included in the digital certificate and the authentication token, and authorizes the virtual device to access and use the key(s) for cryptographic operations if the cryptographic processor 128 recognizes a valid digital certificate and/or in response to a match between the information (e.g., GUID) included in the digital certificate and in the authentication token. In other words, the cryptographic processor 128 obtains the authentication token and/or the digital certificate, reviews the digital certificate and/or the authentication token, determines whether the digital certificate is a valid certificate (including, for example, whether the digital certificate has expired and/or has been invalidated or revoked) and/or determine whether the information (e.g., GUID) included in the digital certificate matches the information (e.g., GUID) included in the authentication token, and authorizes the virtual device to use (or access) the key for cryptographic operations in response to a determination that the digital certificate is valid and/or in response to a determination that the information (e.g., GUID) included in the digital certificate matches the information (e.g., GUID) included in the authentication token. Step 236 may alternatively be performed by the hypervisor 204.

In some embodiments, in step 236, the digital certificate may be sent by the hypervisor 204 (or the virtual device infrastructure 202) to the cryptographic processor 128 to authenticate the connection between the virtual device and the cryptographic processor 128. In some embodiments, the cryptographic processor 128 may validate the digital certificate by, for example, determining whether the digital certificate has been signed by a trusted certificate authority, whether the digital certificate has not expired, and/or whether the digital certificate has not been invalidated or revoked in step 238. In response to validating the digital certificate, the virtual device may establish a connection with the cryptographic processor 128. Further, in some embodiments, in step 236, the virtual device infrastructure 202 (or hypervisor 204) may send the authentication token to the cryptographic processor 128 (e.g., either in response to a request or query from the cryptographic processor 128 or in response to a generation of the authentication token). The cryptographic processor 128 may obtain the authentication token, retrieve information (e.g., GUID) from the authentication token, compare the information included the authentication token to the information (e.g., GUID) included in the digital certificate in step 238. In response to a match between the information (e.g., GUID) included in the authentication token and the information (e.g., GUID) included in the digital certificate, in step 240, the cryptographic processor 128 may allow or permit the virtual device (e.g., the virtual device that is booted or being booted) to access keys (e.g., persisted keys stored in memory 106), such that the virtual device may perform cryptographic operations using the keys. Such cryptographic operations may be performed by the cryptographic processor 128. The keys (e.g., created by the cryptographic processor 128) that are accessed to perform cryptographic operations may be different from the keys generated by the certificate provisioning subsystem 120. The keys to perform cryptographic operations may include different keys for different operations or applications. For example, keys (for performing cryptographic operations) associated with an email application may be different from keys (for performing cryptographic operations) associated with a messaging application.

Alternatively, in step 236, the virtual device infrastructure 202 may send the digital certificate to the cryptographic processor 128 (e.g., HSM). The digital certificate may be sent in order to request the cryptographic processor 128 to grant the virtual device access to one or more keys and to allow the virtual device to use the one or more keys (e.g., a key (or key pair) generated by the certificate provisioning service or another key (or key pair) stored in a memory (or database)) for cryptographic operations. In step 238, the cryptographic processor 128 reviews (or verifies) the digital certificate and authorizes the virtual device to access and use the key for cryptographic operations if the cryptographic processor 128 recognizes a valid digital certificate (including, for example, recognizing that the digital certificate has not expired and/or has not been invalidated or revoked). In other words, the cryptographic processor 128 obtains the digital certificate, reviews the digital certificate, determines whether the digital certificate is a valid certificate, and authorizes the virtual device to use (or access) the one or more keys for performing cryptographic operations in response to a determination that the digital certificate is valid. Step 236 may alternatively be performed by the hypervisor 204.

In step 240, the cryptographic processor 128 sends the hypervisor 204 an authorization to access and use the key (e.g., authorization to allow the virtual device to access and use the one or more keys for cryptographic operations) in response to an acceptance (or verification) of the authentication token (and/or the digital certificate) by the cryptographic processor 128. In some embodiments, the authentication token may be associated with an expiration time. Alternatively, or additionally, in step 240, the cryptographic processor 128 may send the virtual device infrastructure 202 an authorization to access and use the one or more keys (e.g., authorization to allow the virtual device to access and use the one or more keys for cryptographic operations) in response to an acceptance (or verification) of the authentication token (and/or digital certificate) by the cryptographic processor 128 and the virtual device infrastructure 202 may convey such an authorization to the hypervisor 204.

As noted above, the keys generated by the certificate provisioning service may not be persisted and may be temporary. In other words, the keys generated by the certificate provisioning service may only be created or generated in response to a request to boot a virtual device and in response to a determination that the virtual device is a trusted virtual device and these keys may be deleted, removed, or invalidated (or rendered invalid) in response to a reboot (or a reload) or a shutdown of a virtual device. That is, the keys generated by the certificate provisioning service may be boot-specific since they may be generated when a virtual device is being booted (or in response to a request to boot a virtual device) and when the virtual device is determined to be trusted and may be deleted, removed, or invalidated (or rendered invalid) when the trusted virtual device is shutdown or is rebooted (or reloaded). In other words, new keys may be generated or issued in response to a request to boot a virtual device and in response to a determination that the virtual device is a trusted virtual device. Accordingly, computer system 102 may facilitate generation of dynamic keys in response to a request to boot a virtual device and in response to a determination that the virtual device is a trusted virtual device (e.g., in response to a determination that a first boot record matches the second boot record). This is advantageous because it prevents the keys from being used by bad actors for performing cryptographic operations gaining access to the cryptographic processor 128 and for gaining access to keys (e.g., stored in memory 106) that are used for performing cryptographic operations. As noted above, the keys that are used to perform cryptographic operations may be different from the keys generated or issued by the certificate provisioning service. In fact, the keys that are used to perform cryptographic operations may be generated or issued by the cryptographic processor 128, may be persisted, and may be stored in memory 106. On the other hand, the keys generated or issued by the certificate provisioning service may be temporary (e.g., ephemeral, not persisted) and may be used for obtaining access to the persisted keys stored in memory 106.

Accordingly, the process described herein helps determine whether a virtual device (which is loaded or being loaded) is a trusted virtual device and facilitates boot-specific key access to a trusted virtual device, thereby allowing the trusted virtual device (e.g., an operating system associated with the virtual device or virtual applications associated with the virtual device) to access and use the keys for performing cryptographic operations to communicate information within the computer system 102 and outside the computer system 102. The cryptographic processor 128 may be used to perform encryption and decryption functions using the keys. Although this description has been described with regard to boot-specific key access to perform cryptographic operations, it should be understood that the described operations may be relevant to other operations or services. In other words, in addition to securing access to the cryptographic services of the cryptographic processor 128, the described operations can be used to secure access to other services (e.g., system update service, data synchronization service, etc.). That is, the described operations can be used for provisioning identity and securing communications with any other entity (e.g., a processor associated with another service) in addition to the described operations being used for provisioning identity and securing communications with the cryptographic processor 128.

Figure 3:
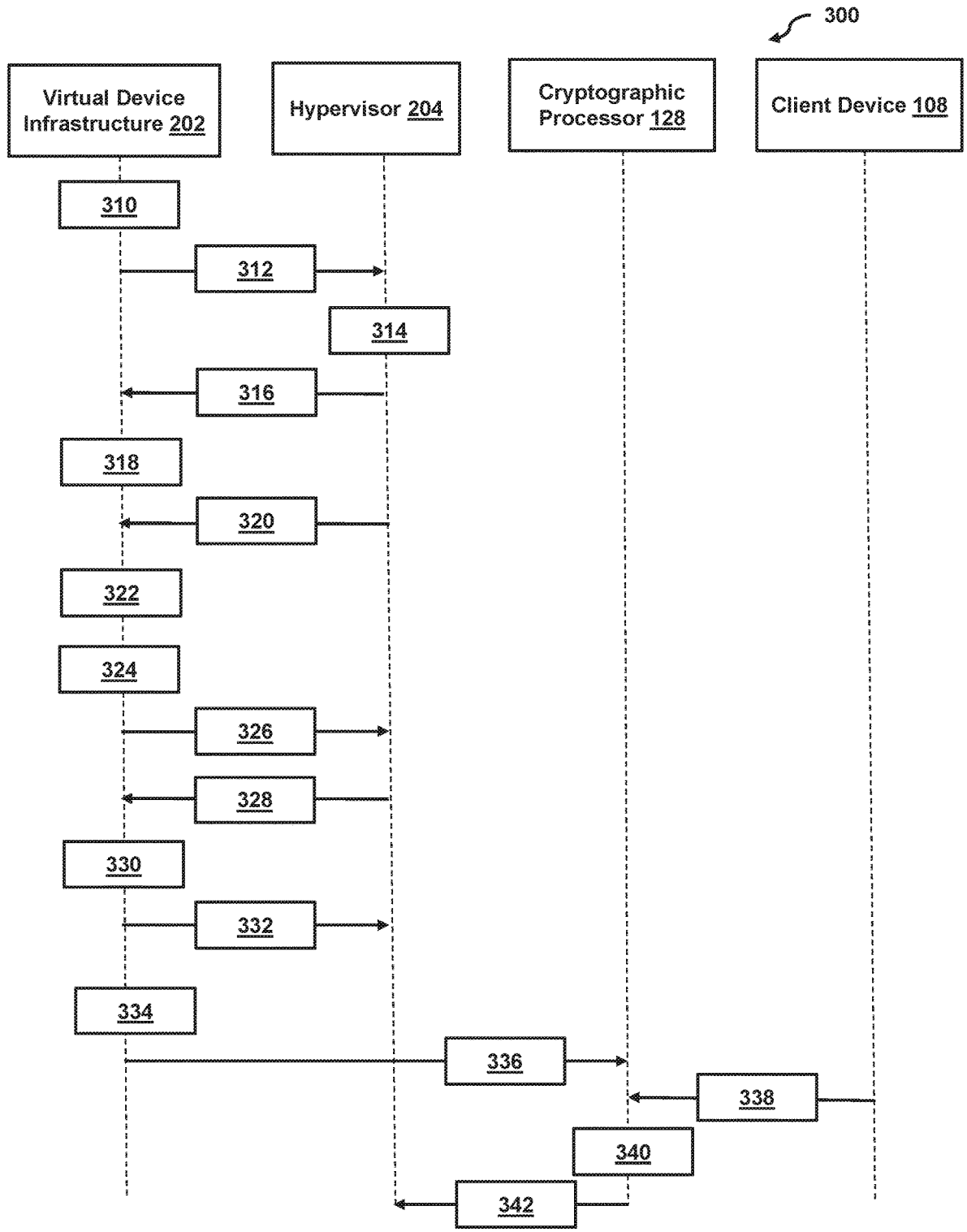
FIG. 3 a method performed by different components of the virtual device platform for facilitating boot-specific key access to perform cryptographic operations, in accordance with one or more embodiments.

FIG. 3 shows a method 300 performed by different components of the virtual device platform for authorizing access to keys for cryptographic operations. Steps 310-336 are the same as steps 210-236 describe above with regarding to FIG. 2. Accordingly, for the sake of brevity, description related to these steps are not repeated. In step 338, the cryptographic processor 128 may obtain an external security token (e.g., YubiKey™, RSA SecurID™, Titan Security Key™ etc.) from the client device 108. The client device 108 may obtain the external security token from, for example, an external authentication device and a user may input such an authentication token via a user interface of the client device 108. Alternatively, or additionally, the client device 108 may host a client application that generates the external security token. Although FIG. 3 illustrates that the client device 108 send the external security token to the cryptographic processor 128, it should be understood that the client device 108 may communicate the external security token to the virtual device infrastructure 202 (or the hypervisor 204) and the virtual device infrastructure 202 (or the hypervisor 204) may then communicate the external security token to the cryptographic processor 128.

In step 340, the cryptographic processor 128 reviews the digital certificate or the authentication token (and the information contained in the authentication token or the digital certificate) and reviews the obtained external security token and authorizes the virtual device to access and use the one or more keys for cryptographic operations if the cryptographic processor 128 recognizes a valid digital certificate (and/or a valid authentication token) and if the cryptographic processor 128 recognizes a valid external security token. In other words, the cryptographic processor 128 obtains the digital certificate (and/or authentication token) and the external security token, reviews the digital certificate (and/or the authentication token) and reviews the external security token, determines whether the digital certificate is a valid certificate (and/or determine whether the authentication token is a valid token) and whether the external security token is valid, and authorizes the virtual device to use (or access) the one or more keys for cryptographic operations in response to a determination that the digital certificate (and/or the authentication token) and the external security token are valid.

In step 342, the cryptographic processor 128 sends the hypervisor 204 an authorization to access and use the one or more keys (e.g., authorization to allow the virtual device to access and use the one or more keys for cryptographic operations) in response to an acceptance (or verification) of the digital certificate (and/or authentication token) and in response to acceptance (or verification) of the external security token by the cryptographic processor 128. In some embodiments, the digital certificate (and/or authentication token) may be associated with an expiration time. Alternatively, or additionally, in step 342, the cryptographic processor 128 sends the virtual device infrastructure 202 an authorization to access and use the one or more keys (e.g., authorization to allow the virtual device to access and use the one or more keys for cryptographic operations) in response to an acceptance (or verification) of the digital certificate (and/or authentication token) and in response to an acceptance (or verification) of the external security token by the cryptographic processor 128 and the virtual device infrastructure 202 may convey such an authorization to the hypervisor 204.

It may be advantageous to authorize access to the one or more keys (e.g., authorization to allow the virtual device to access and use the one or more keys for cryptographic operations) in response to a verification of an external security token provided by the client device 108. For instance, a bad actor having access to the client device 108 may also obtain access to the virtual device and the operations performed by the virtual device. In order to avoid a bad actor from performing actions that may be detrimental to the virtual device, the external security tokens are an added advantage to ensure that the bad actor cannot perform actions that may be detrimental to the virtual device simply by gaining access to the client device 108. In other words, without the external security token, the bad actor would be unable to gain access to (or use) the key for performing cryptographic operations.

Figure 4:
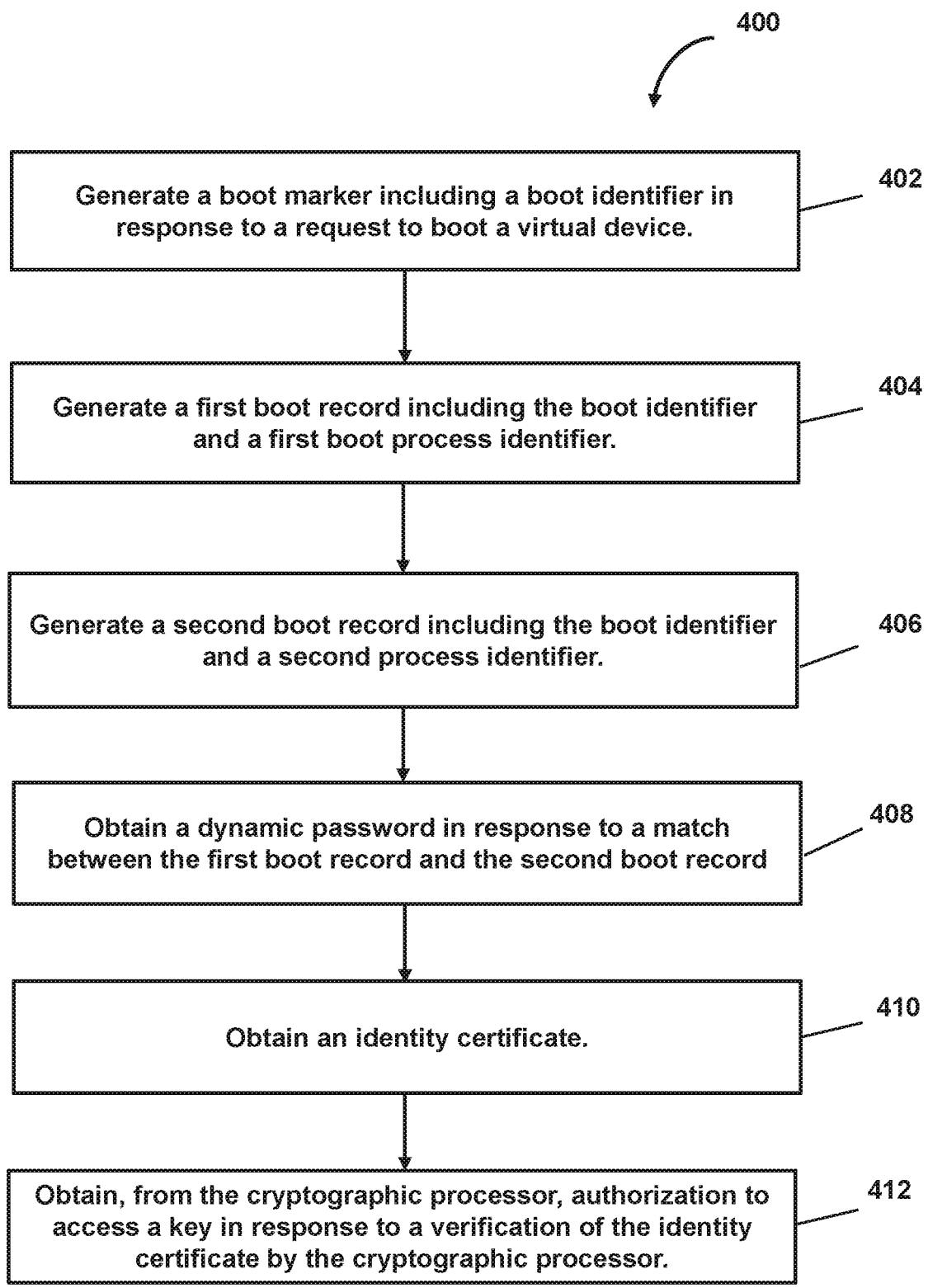
FIG. 4 shows a method performed by a virtual device platform for facilitating boot-specific key access to perform cryptographic operations, in accordance with one or more embodiments.

FIG. 4 shows a method 400 performed by a virtual device platform for facilitating boot-specific key access to perform cryptographic operations. In step 402, a boot marker may be generated in response to a request to boot a virtual device. The boot marker may include a boot identifier. The boot identifier may be associated with the request to boot a virtual device. As noted above, the boot identifier may be randomly generated and may correspond to a globally unique identifier (GUID) or a universally unique identifier (UUID). The boot marker may also include information associated with the virtual device platform (e.g., information related to services associated with the virtual device platform and information identifying location of various services within the virtual device platform). In step 404, a first boot record may be generated. The first boot record may include the boot identifier and a first boot process identifier. The first boot process identifier may be associated with a process of booting the virtual device. The first boot process identifier may be randomly generated.

In step 406, a second boot record may be generated. The second boot record may include the boot identifier and a second process identifier. The second boot process identifier may be associated with a process of booting the virtual device. The first boot record and the second boot record may be generated by different components of the virtual device platform. The second boot record may be generated in parallel to the generation of the first boot record or may be generated after the generation of the first boot record. In step 408, the first boot record may be compared to the second boot record. In response to a match between the first boot record and the second boot record, a dynamic password may be obtained. In step 410, an identity certificate may be obtained. The identity certificate may be generated in response to a verification of the dynamic password, and the identity certificate may include an identifier of the virtual device. The identity certificate may include information about the virtual device (e.g., name of the virtual device, version of the virtual device, patch level of the version of the virtual device), information about the key (e.g., information about a public key associated with the virtual device and its expiration date), information about an entity that verified the certificate's content (e.g., the certificate issuer's name), the certificate issuer's digital signature, etc. The obtained identity certificate may be associated with an expiration time such that the identity certificate may be deleted after a predetermined amount of time or the identity certificate may be invalidated after a predetermined amount of time.

In step 412, an authorization to access a key may be obtained in response to a verification of the identity certificate by the cryptographic processor. In other words, the cryptographic processor reviews the identity certificate and authorizes the virtual device to access and use the key for cryptographic operations if the cryptographic processor recognizes a valid identity certificate.

Figure 5:
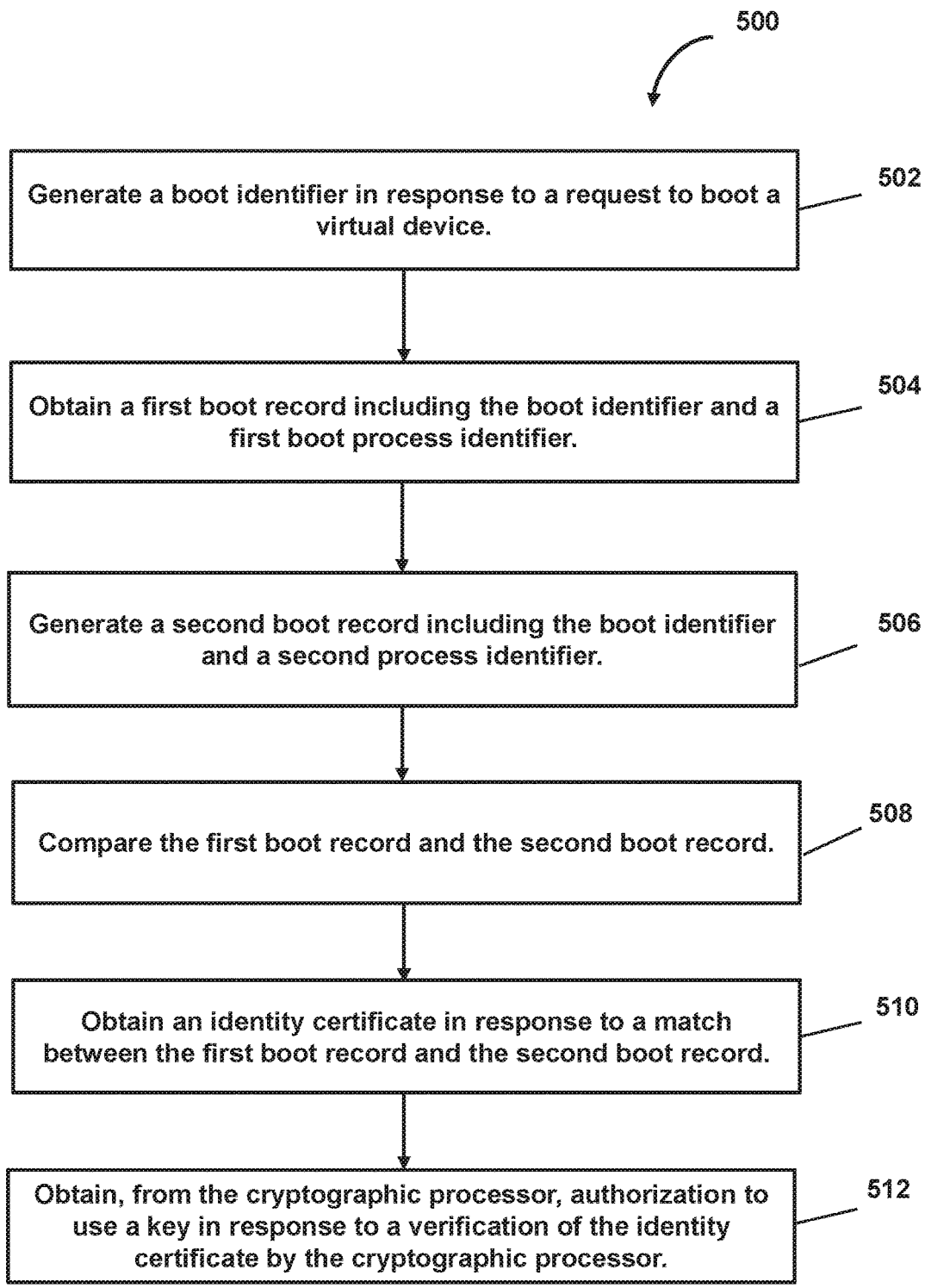
FIG. 5 shows a method performed by a virtual device infrastructure of a virtual device platform for facilitating boot-specific key access to perform cryptographic operations, in accordance with one or more embodiments.

FIG. 5 shows a method 500 performed by a virtual device infrastructure of a virtual device platform for facilitating boot-specific key access to perform cryptographic operations. In step 502, a boot identifier may be generated in response to a request to boot a virtual device. The boot identifier may be associated with the request to boot a virtual device. As noted above, the boot identifier may be randomly generated and may correspond to a globally unique identifier (GUID) or a universally unique identifier (UUID). In step 504, a first boot record may be obtained. The first boot record may include the boot identifier and a first boot process identifier. The first boot process identifier may be associated with a process of booting the virtual device. The first boot process identifier may be randomly generated.

In step 506, a second boot record may be generated. The second boot record may include the boot identifier and a second process identifier. The second boot process identifier may be associated with a process of booting the virtual device. The second boot record may be generated in parallel to the generation of the first boot record or may be generated after the generation of the first boot record. In step 508, the first boot record may be compared to the second boot record. In step 510, an identity certificate may be obtained in response to a a match between the first boot record and the second boot record. The identity certificate may include an identifier of the virtual device. The identity certificate may include information about the virtual device (e.g., name of the virtual device, version of the virtual device, patch level of the version of the virtual device), information about the key (e.g., information about a public key associated with the virtual device and its expiration date), information about an entity that verified the certificate's content (e.g., the certificate issuer's name), the certificate issuer's digital signature, etc. The obtained identity certificate may be associated with an expiration time such that the identity certificate may be deleted after a predetermined amount of time or the identity certificate may be invalidated after a predetermined amount of time.

In step 512, an authorization to use a key may be obtained in response to a verification of the identity certificate by the cryptographic processor. In other words, the cryptographic processor reviews the identity certificate and authorizes the virtual device to access and use the key for cryptographic operations if the cryptographic processor recognizes a valid identity certificate.

Figure 6:
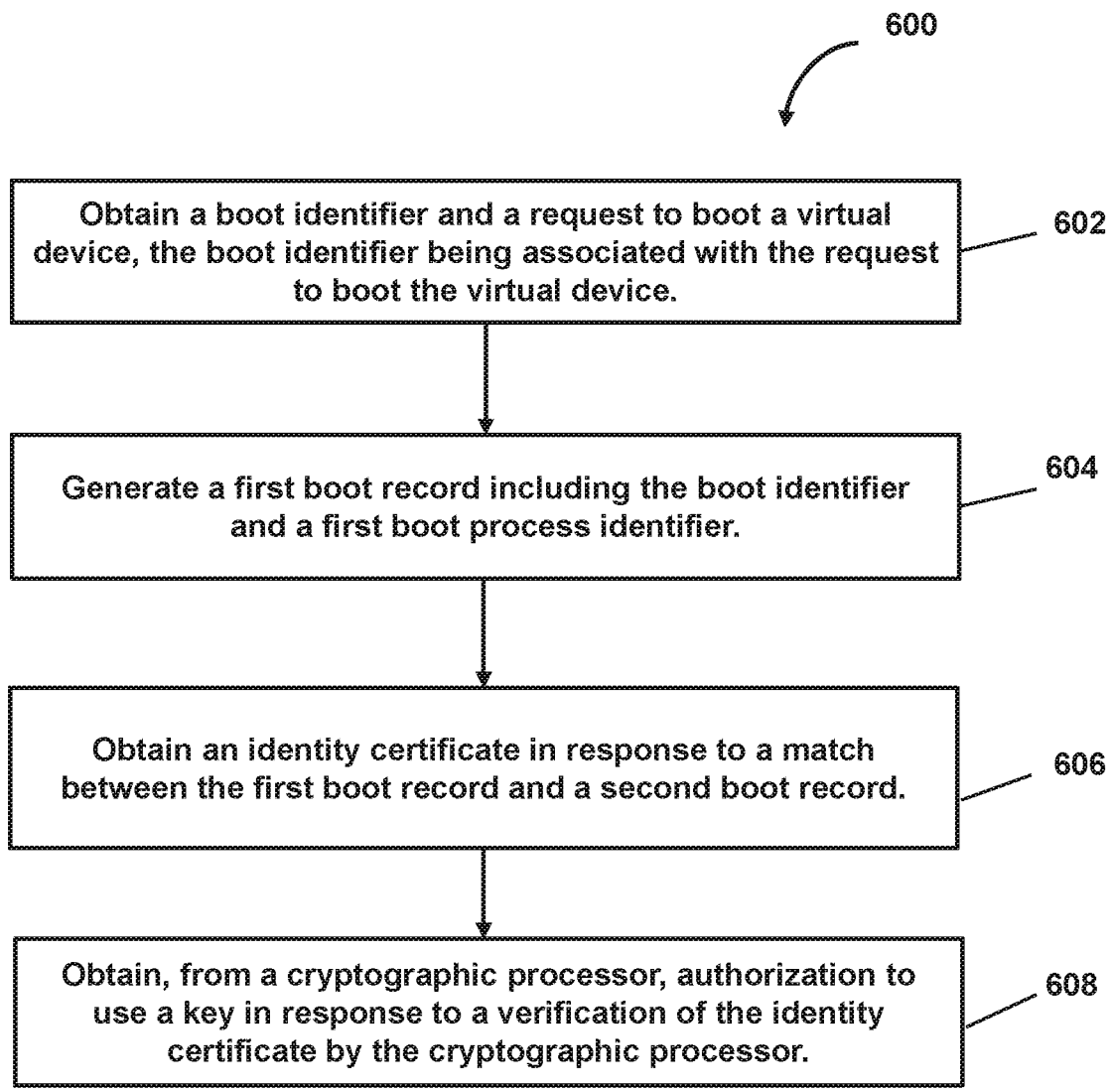
FIG. 6 shows a method performed by a hypervisor of a virtual device platform for facilitating boot-specific key access to perform cryptographic operations, in accordance with one or more embodiments.

FIG. 6 shows a method 600 performed by a hypervisor of a virtual device platform for facilitating boot-specific key access to perform cryptographic operations. In step 602, a boot identifier and a request to boot a virtual device may be obtained. The boot identifier may be associated with the request to boot the virtual device. As noted above, the boot identifier may be randomly generated and may correspond to a globally unique identifier (GUID) or a universally unique identifier (UUID). In step 604, a first boot record may be generated. The first boot record may include the boot identifier and a first boot process identifier. The first boot process identifier may be associated with a process of booting the virtual device. The first boot process identifier may be randomly generated.

In step 606, an identity certificate may be obtained in response to a match between the first boot record and the second boot record. The identity certificate may include an identifier of the virtual device. The identity certificate may include information about the virtual device (e.g., name of the virtual device, version of the virtual device, patch level of the version of the virtual device), information about the key (e.g., information about a public key associated with the virtual device and its expiration date), information about an entity that verified the certificate's content (e.g., the certificate issuer's name), the certificate issuer's digital signature, etc. The obtained identity certificate may be associated with an expiration time such that the identity certificate may be deleted after a predetermined amount of time or the identity certificate may be invalidated after a predetermined amount of time.

In step 608, an authorization to use a key may be obtained in response to a verification of the identity certificate by the cryptographic processor. In other words, the cryptographic processor reviews the identity certificate and authorizes the virtual device to access and use the key for cryptographic operations if the cryptographic processor recognizes a valid identity certificate.

In some embodiments, the various computers and subsystems illustrated in FIGS. 1-3 may include one or more computing devices that are programmed to perform the functions described herein. The computing devices may include one or more electronic storages (e.g., memory 106, database(s) 132, or other electronic storages), one or more physical processors programmed with one or more computer program instructions, circuitry, and/or other components. The computing devices may include communication lines or ports to enable the exchange of information within a network (e.g., network 152) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-124 and 142-144, virtual device infrastructure 202, hypervisor 204, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-124 and 142-144 and the functionality provided by virtual device infrastructure 202 and hypervisor 204 described herein is for illustrative purposes, and is not intended to be limiting, as any of subsystems 112-124 and 142-144, virtual device infrastructure 202, hypervisor 204 may provide more or less functionality than is described. For example, one or more of subsystems 112-124 and 142-144, virtual device infrastructure 202, and hypervisor 204 may be eliminated, and some or all of its functionality may be provided by other ones of subsystems 112-124 and 142-144, virtual device infrastructure 202, and hypervisor 204. As another example, additional subsystems may be programmed to perform some or all of the functionality attributed herein to one of subsystems 112-124 and 142-144, virtual device infrastructure 202, and hypervisor 204.

Although the present disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

The present techniques will be better understood with reference to the following enumerated embodiments:

1. A method comprising: obtaining an identity certificate in response to a match between a first boot record and a second boot record; and obtaining authorization to use or access a service in response to a verification of the identity certificate.
2. The method according to embodiment 1, wherein the service is at least one of a cryptographic service, system update service, or data synchronization service.
3. The method according to any of embodiments 1-2, further comprising: obtaining, from a cryptographic processor, authorization to use or access a key in response to the verification of the identity certificate by the cryptographic processor.
4. The method according to any of embodiments 1-3, further comprising: generate a boot marker including a boot identifier in response to a request to boot a virtual device; generate the first boot record including the boot identifier and a first boot process identifier, the first boot process identifier being associated with the booting of the virtual device; generate the second boot record including the boot identifier and a second process identifier, the second process identifier being associated with the booting of the virtual device; and obtain the identity certificate, the identity certificate including an identifier of the virtual device, the identity certificate being obtained in response to the match between the first boot record and the second boot record.
5. The method according to any of embodiments 1-4, further comprising: generating a boot marker including a boot identifier in response to a request to boot a virtual device; generating the first boot record including the boot identifier and a first boot process identifier, the first boot process identifier being associated with the booting of the virtual device; generating the second boot record including the boot identifier and a second process identifier, the second process identifier being associated with the booting of the virtual device; obtaining a dynamic credential in response to a match between the first boot record and the second boot record; and obtaining the identity certificate, the identity certificate including an identifier of the virtual device and the identity certificate being generated in response to a verification of the dynamic credential.
6. The method according to any of embodiments 1-5, further comprising: generating a boot identifier in response to a request to boot a virtual device; obtaining the first boot record including the boot identifier and a first boot process identifier, the first boot process identifier being associated with the booting of the virtual device; generating the second boot record including the boot identifier and a second process identifier, the second process identifier being associated with the booting of the virtual device; and comparing the first boot record and the second boot record and obtaining the identity certificate in response to the match between the first boot record and the second boot record, the identity certificate including an identifier of the virtual device.
7. The method according to any of embodiments 1-6, further comprising: obtaining a boot identifier and a request to boot a virtual device, the boot identifier being associated with the request to boot the virtual device; and generating the first boot record including the boot identifier and a first boot process identifier, the first boot process identifier being associated with the booting of the virtual device, wherein the second boot record includes the boot identifier and a second process identifier, the second process identifier being associated with the booting of the virtual device, and the identity certificate including an identifier of the virtual device.
8. The method according to any of embodiments 1-7, obtaining, from a physical client device, an external security token, wherein the authorization to use the key is further in response to a verification of the external security token by the cryptographic processor.
9. The method according to any of embodiments 1-8, wherein the first boot record is obtained from a hypervisor of a virtual device platform.
10. The method according to any of embodiments 1-9, further comprising: generating a boot marker that includes information related to services associated with a virtual device platform that hosts the virtual device, wherein the first boot record includes the boot marker.
11. The method according to any of embodiments 1-10, wherein the identity certificate expires after a predetermined amount of time, and wherein the identity certificate is verified by the cryptographic processor prior to an expiration of the predetermined amount of time.
12. The method according to any of embodiments 1-11, wherein the authorization to use the key is an authorization to allow the virtual device to access and use the key for cryptographic operations.
13. The method according to any of embodiments 1-12, wherein the first boot record expires after a predetermined amount of time, and wherein the first boot record and the second boot record are compared prior to an expiration of the predetermined amount of time.
14. The method according to any of embodiments 1-10, wherein the key is generated by the cryptographic processor and wherein the key is stored in a memory separate from the cryptographic processor.
15. The method according to any of embodiments 1-14, wherein the authorization to access the key is an authorization to allow the virtual device to access and use the key for cryptographic operations.
16. A system, comprising: one or more processors; and memory storing instructions that when executed by the processors cause the processors to effectuate operations comprising those of any of embodiments 1-15.
17. A tangible, non-transitory, machine-readable medium storing instructions that when executed by a data processing apparatus cause the data processing apparatus to perform operations comprising those of any of embodiments 1-15.

What is claimed is:

1. A system for facilitating boot-specific key access in a virtual device platform, the system comprising:
the virtual device platform including circuitry configured to:
generate a first boot marker including a first boot identifier in response to a request to boot a virtual device;
generate a second boot marker including a second boot identifier in response to the request to boot the virtual device, where the second boot marker is associated with a trusted virtual device;
generate, by a first subsystem of the virtual device platform, a first boot record including the first boot identifier and a first boot process identifier, the first boot process identifier being associated with a booting of the virtual device;
generate, by a second subsystem of the virtual device platform, a second boot record including the second boot identifier and a second process identifier, the second process identifier being associated with a booting of the trusted virtual device;
obtain a dynamic credential in response to a match between the first boot record and the second boot record, where the match comprises:
a match between the first boot identifier and the second boot identifier, and
a match between the first process identifier and the second process identifier;
obtain an identity certificate, the identity certificate including an identifier of the virtual device and the identity certificate being generated in response to a verification of the dynamic credential; and
obtain, from a cryptographic processor, authorization to access a key in response to a verification of the identity certificate by the cryptographic processor.

2. The system of claim 1, wherein the first boot marker and the second boot marker include information related to services associated with the virtual device platform.

3. The system of claim 1, wherein the authorization to access the key is an authorization to allow the virtual device to access and use the key for cryptographic operations.

4. The system of claim 1, wherein the first boot record expires after a predetermined amount of time, and wherein the circuitry is configured to compare the first boot record and the second boot record prior to an expiration of the predetermined amount of time.

5. The system of claim 1, wherein the identity certificate expires after a predetermined amount of time, and wherein the identity certificate is verified by the cryptographic processor prior to an expiration of the predetermined amount of time.

6. The system of claim 1, wherein the key is generated by the cryptographic processor and stored in a memory associated with the virtual device platform.

7. A method for facilitating boot-specific key access, the method comprising:
generating a first boot identifier in response to a request to boot a virtual device;
generating a second boot identifier in response to the request to boot the virtual device, where the second boot identifier is associated with a trusted virtual device;
generating and obtaining, by a first subsystem, a first boot record including the first boot identifier and a first boot process identifier, the first boot process identifier being associated with a booting of the virtual device;
generating, by a second subsystem, a second boot record including the second boot identifier and a second process identifier, the second process identifier being associated with a booting of the trusted virtual device;
comparing the first boot record and the second boot record and obtaining an identity certificate in response to a match between the first boot record and the second boot record, the identity certificate including an identifier of the virtual device, where the match comprises:
a match between the first boot identifier and the second boot identifier, and
a match between the first process identifier and the second process identifier; and
obtaining, from a cryptographic processor, authorization to use a key in response to a verification of the identity certificate by the cryptographic processor.

8. The method of claim 7, the method further comprising:
obtaining, from a physical client device, an external security token, wherein the authorization to use the key is further in response to a verification of the external security token by the cryptographic processor.

9. The method of claim 7, wherein the first boot record is obtained from a hypervisor of a virtual device platform.

10. The method of claim 7, further comprising:
generating a first boot marker and a second boot marker that include information related to services associated with a virtual device platform that hosts the virtual device,
wherein the first boot record includes the first boot marker and the second boot record includes the second boot marker.

11. The method of claim 7, wherein the identity certificate expires after a predetermined amount of time, and wherein the identity certificate is verified by the cryptographic processor prior to an expiration of the predetermined amount of time.

12. The method of claim 7, wherein the authorization to use the key is an authorization to allow the virtual device to access and use the key for cryptographic operations.

13. The method of claim 7, wherein the first boot record expires after a predetermined amount of time, and wherein the first boot record and the second boot record are compared prior to an expiration of the predetermined amount of time.

14. The method of claim 7, wherein the key is generated by the cryptographic processor and wherein the key is stored in a memory separate from the cryptographic processor.

15. A system for facilitating boot-specific access to a service in a virtual device platform, the system comprising:
the virtual device platform including circuitry configured to:
generate a first boot marker including a first boot identifier in response to a request to boot a virtual device;
generate a second boot marker including a second boot identifier in response to the request to boot the virtual device, where the second boot marker is associated with a trusted virtual device;
generate, by a first subsystem of the virtual device platform, a first boot record including the first boot identifier and a first boot process identifier, the first boot process identifier being associated with a booting of the virtual device;
generate, by a second subsystem of the virtual device platform, a second boot record including the second boot identifier and a second process identifier, the second process identifier being associated with a booting of the trusted virtual device;
obtain an identity certificate, the identity certificate including an identifier of the virtual device, the identity certificate being obtained in response to a match between the first boot record and the second boot record, where the match comprises:
a match between the first boot identifier and the second boot identifier, and
a match between the first process identifier and the second process identifier; and
obtain authorization to access or use a service via the virtual device platform in response to a verification of the identity certificate.

16. The system of claim 15, wherein the service is at least one of a cryptographic service, system update service, or data synchronization service.

* * * * *